US012548398B2

(12) United States Patent
LaRoach

(10) Patent No.: US 12,548,398 B2

(45) Date of Patent: Feb. 10, 2026

(54) SYSTEM AND METHOD FOR ATTACHING AND INSTALLING A REEL STRIP TO A GAMING MACHINE REEL

(71) Applicant: Aristocrat Technologies, Inc., Las Vegas, NV (US)

(72) Inventor: Philip LaRoach, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 188 days.

(21) Appl. No.: 18/370,739

(22) Filed: Sep. 20, 2023

(65) Prior Publication Data

US 2024/0112530 A1 Apr. 4, 2024

Related U.S. Application Data

(60) Provisional application No. 63/411,212, filed on Sep. 29, 2022.

(51) Int. Cl.
*G07F 17/32* (2006.01)

(52) U.S. Cl.
CPC ................................ *G07F 17/3213* (2013.01)

(58) Field of Classification Search
CPC .................................................. G07F 17/3213
See application file for complete search history.

(56) References Cited

U.S. PATENT DOCUMENTS 7,316,395 B1 1/2008 Kromydas
8,540,245 B2 9/2013 Rasmussen
8,684,358 B2 4/2014 Stewart
9,361,751 B2 6/2016 Hernandez
2008/0119263 A1* 5/2008 Haga .................. G07F 17/3213 463/20
2010/0113128 A1 5/2010 Snow
2012/0200032 A1* 8/2012 Stewart ............... G07F 17/3213 273/138.1
2015/0102557 A1* 4/2015 Thoeni .................... G07F 17/32 273/143 R
2015/0102558 A1* 4/2015 Hernandez .............. G07F 17/32 273/143 R
2020/0273298 A1* 8/2020 Hillstrom ............ G07F 17/3216

* cited by examiner

*Primary Examiner* — David L Lewis
*Assistant Examiner* — Shauna-Kay N. Hall
(74) *Attorney, Agent, or Firm* — Weaver Austin Villeneuve & Sampson LLP

(57) ABSTRACT

A reel strip retention system to releasably attach a reel strip onto a reel basket using one or more tabs on the reel strip that engage with corresponding one or more slots positioned around an edge of the reel basket. The reel strip includes a pair of indents positioned adjacent a first end of the reel strip. The reel strip includes an adhesive layer positioned at either the first end or at the opposite second end of the reel strip. The reel basket includes a pair of detents positioned on the edge of the reel basket. The detents of the reel basket engage with the indents of the reel tape to attach the reel strip to the reel cage in a reliable, precise, and consistent manner and ensuring that the reel strip is in a correct starting position on the reel basket. As the reel strip is wound around the reel basket, the one or more tabs are inserted into the corresponding one or more slots on the reel basket. Once the reel strip is wrapped fully around the reel basket, the free second end of the reel strip and first end of the reel strip are pressed together and secured with the adhesive strip.

20 Claims, 25 Drawing Sheets

SYSTEM AND METHOD FOR ATTACHING AND INSTALLING A REEL STRIP TO A GAMING MACHINE REEL

RELATED APPLICATION

The present application claims priority to U.S. Provisional Patent Application No. 63/411,212, filed Sep. 29, 2022, and entitled "System and Method for Attaching and Installing a Reel Strip to a Gaming Machine Reel," which is hereby incorporated by reference in its entirety.

BACKGROUND

The present disclosure is generally directed to a reel strip retention system for attaching and securing a reel strip to a reel basket.

A variety of electronic gaming machines ("EGMs") are known in the art. Some EGMs are mechanical or electromechanical in nature that include physical reels while other EGMs are primarily computer or video gaming machines. While the computer or video EGMs have found gained significant popularity, more traditional mechanical and electromechanical EGMs remain popular. While the images and symbols contains on these reels may be designed specifically for a particular game, the rest of the EGM may be a more standardized system capable of being used for many different games. As a result, the reels need to be interchangeable.

Additionally, to ensure that the mechanical and electromechanical EGMs remain attractive, manufacturers have put emphasis on the appearance of the physical reels. For example, varying the varying the overall appearance of the reels or the reel strips attached to the reels, can completely change the look and feel of the reel design and gaming experience. Therefore, it is important for manufacturers to have the ability to swap our reel designs to update their mechanical and electromechanical EGMs.

Traditional EGMs with mechanical reels have utilized different ways to display shapes on symbols on the reels. For example, in some variants, the symbols may be directly printed or stamped upon the reels. Such a method has limitations however, as the reels must be removed from the EGM and exchanged to achieve different appearance. Another approach has been to use removable reel strips attached to reel baskets. Such configurations allow technicians to more easily replace worn strips or install new strips with different artwork. Additionally the use of removable strips provides manufacturers additional flexibility in the types and number of different shapes and symbols displayed on the reel strip.

One significant problem associated with the use of reel strips is securing the reel strip to the reel basket securely and precisely such that the reel strip is aligned correctly on the reel basket during assembly. Traditionally, technicians would "eyeball" the alignment position which could result in potential misalignment. A misaligned reel can lead player confusion if, for example, a symbol is only partially positioned on a payline. An additional drawback to the "eyeball" approach is that it can be time consuming when servicing multiple reels and/or multiple machines.

Various methods have be used to secure the reel strips onto the reel baskets. One such approach involves use of an adhesive tape to secure one end of the strip to the reel basket and another end of the strip to itself. Such an approach suffers from the alignment issues described above and removal of the reel strip could become arduous as a result of the adhesive sticking directly to the reel basket. Other examples have used snap rivets with caps. Use of these rivets is visually unappealing, however, because the caps are visible to the player, destroying the perception of a seamless reel. Thus, a need exists for an improved apparatus and method for securing a reel strip onto a reel basket such that the reel strip is aligned properly and the reel strip appears as seamless.

EGMS or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

The following detailed description illustrates embodiments of the disclosure by way of example and not by way of limitation. Specifically a system and method for attaching a reel strip to a reel basket are described herein. In some embodiments the reel strip includes one or more tabs that engage with corresponding one or more slots on the reel basket to secure the reel strip to the reel basket. The reel strip may also include one or more indents and the reel basket may include one or more corresponding detents. In such an embodiment, the reel strip is precisely positionable at the correct starting location on the reel basket by engaging the indents of the reel strip with the detents of the reel basket. As a result, the technician knows that the reel strip begins at the correct location and is oriented in the correct direction when the reel strip is assembled with the reel basket.

A method for installing a reel strip onto a reel basket is disclosed. The reel strip is positioned on the reel basket such that one or more detents projecting inward from an edge of the reel basket are positioned in corresponding one or more indents on the reel strip. The indent is positioned proximate a first end of the reel strip. Confirming the correct orientation of the reel strip by at least partially wrapping the reel strip around the reel basket thereby lining-up one or more tabs protruding from an edge of the reel strip with one or more corresponding slots positioned on one or both edges of the reel basket. The distance between the tabs and indent is unidirectional, therefore, if the reel strip is positioned backwards, the one or more tabs will not line up with the corresponding one or more slots. Starting with the tab or tabs closest to the first end of the reel strip, wrapping the reel strip around the reel basket and successively pressing or inserting the one or more tabs into the corresponding slots on the reel basket until reaching the last of the one or more tabs proximate a second end of the reel strip. Pressing the second end of the reel strip onto the first end of the reel strip thereby adhering the two ends of the reel strip with the adhesive layer.

DETAILED DESCRIPTION

The following detailed description illustrates embodiments of the disclosure by way of example and not by way of limitation. Specifically embodiments of a reel strip retention system for attaching a reel strip to a reel basket, and method thereof, are described herein. Conventional mechanical reels and reel strip retention systems present risk of misalignment and/or undesirable visible fasteners eliminating the look of a seamless reel. The reel strip retention system described herein eliminates these issues and ensures that a reel strip when mounted onto a reel basket is both aligned and appears seamless.

In some embodiments, the reel strip retention system includes a reel strip having one or more tabs projecting from one or both sides of the reel strip. The tabs engage with corresponding one or more slots positioned around an edge of the reel basket. The reel strip also includes one or more indents positioned adjacent a first end of the reel strip and an adhesive layer positioned at either the first end or at the opposite second end of the reel strip. The reel basket also includes a pair of detents projecting inward from one or both edges of the reel basket. The detents of the reel basket engage with the indents of the reel strip providing an anchor point to attach the reel strip to the reel cage in a reliable, precise, and consistent manner and ensuring that the reel strip is in a correct starting position on the reel basket. When the reel strip is wrapped fully around the reel basket (e.g., the reel strip resides within and against walls of the reel basket) in the reel retention system, the free second end and first end of the reel strip are pressed together and secured with the adhesive strip.

In a preferred embodiment, the reel strips includes a pair of indents positioned proximate one end and on opposite sides of the reel strip and a corresponding pair of detents projecting inward on both edges of the reel basket. In such an embodiment the reel strip may also include seven tabs positioned on both sides of the reel strip and corresponding six slots positioned on both edges of the reel basket. The first and the last tab the reel strip are positioned in the same slot. The positioning of the indent(s)/detent(s) relative to the tab(s)/slot(s) is unidirectional meaning that the reel strip can only be installed in a single (and correct) direction during assembly (i.e., connecting the reel strip with the reel basket) for all of the indent(s)/detent(s) and tab(s)/slot(s) to line up. As the reel strip is wound around the reel basket, the one or more tabs are inserted into the corresponding one or more slots on the reel basket.

Figure 1:
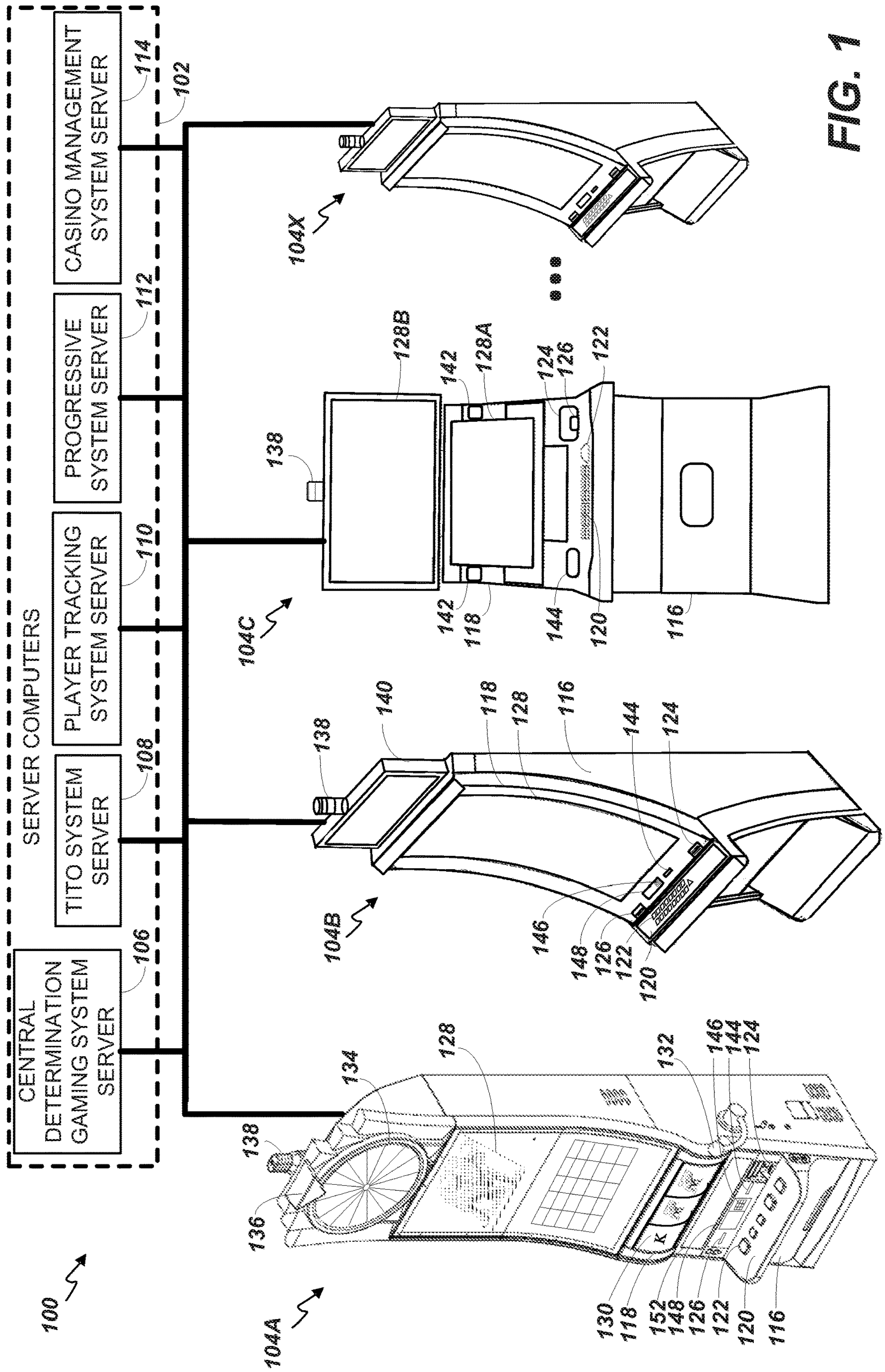
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
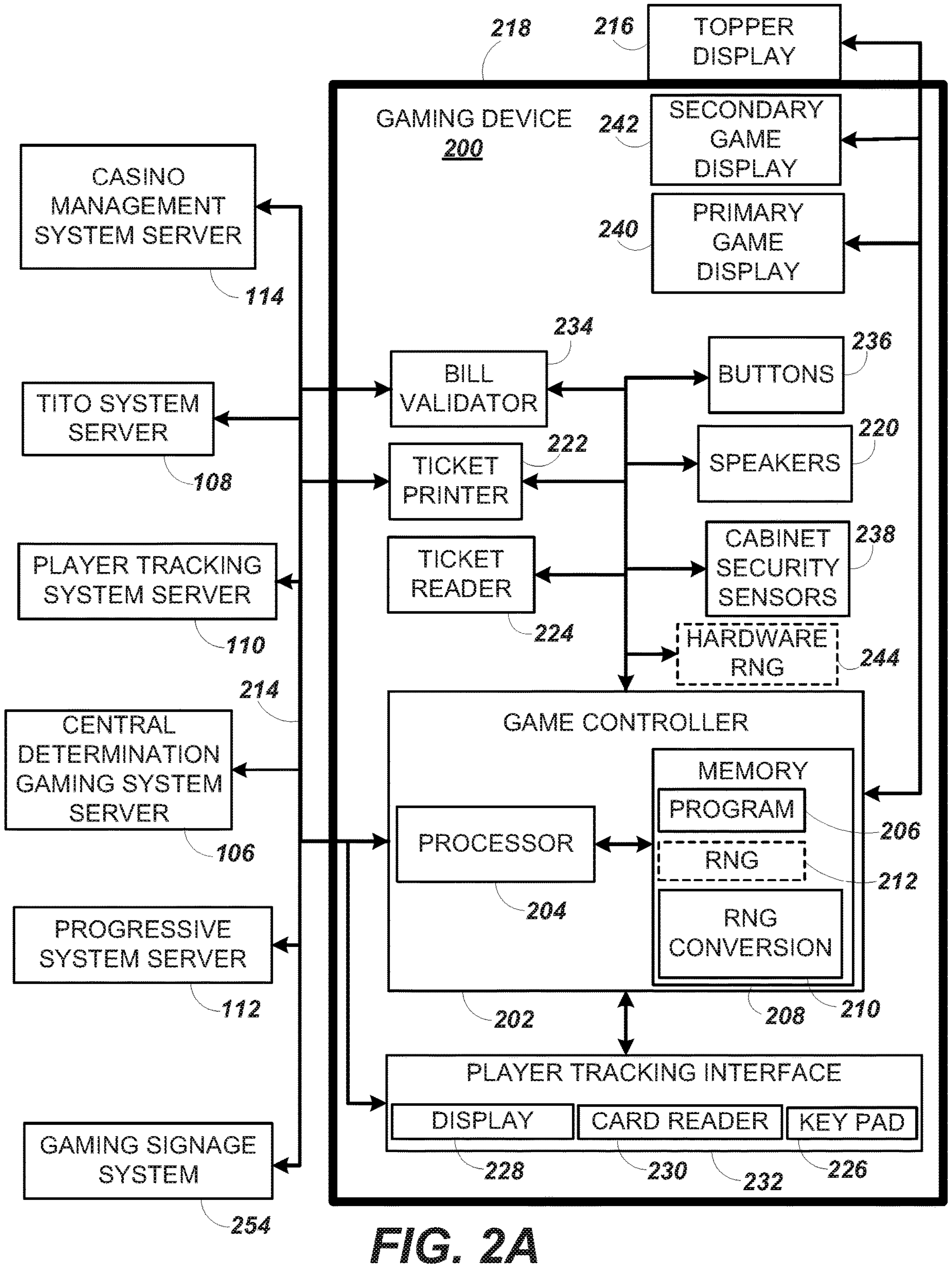
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS ° system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A)

configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
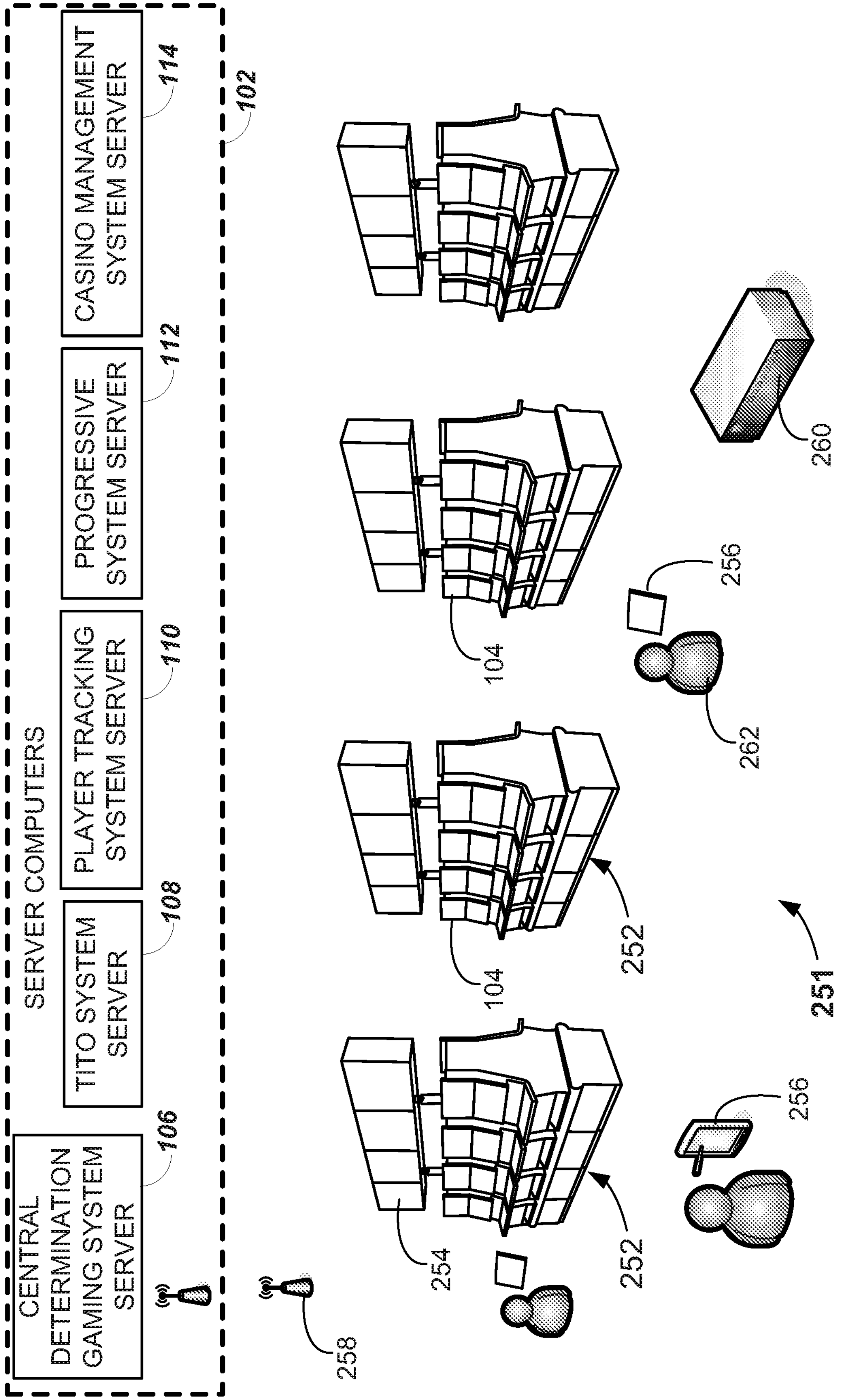
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
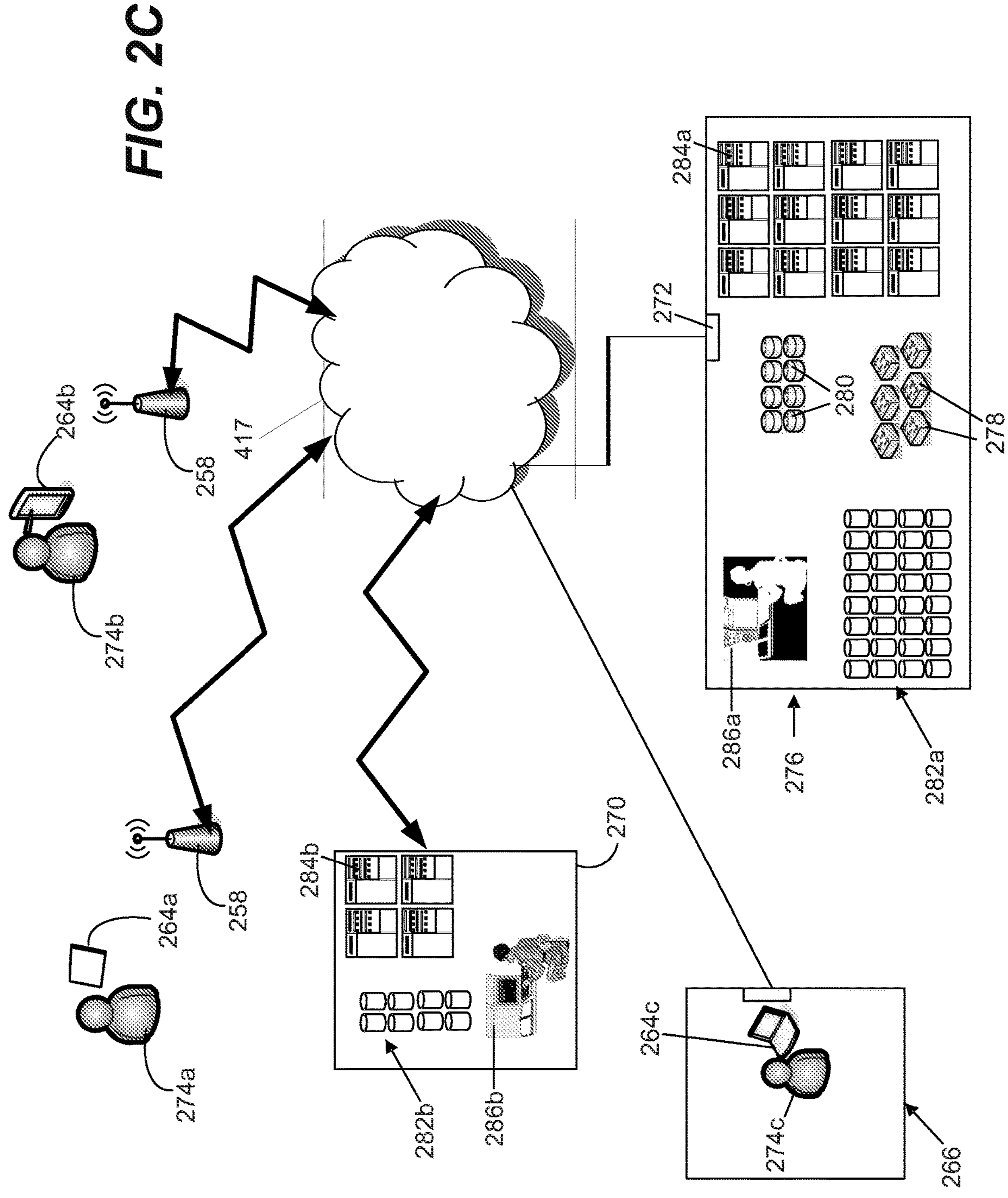
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) **264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2**C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices **282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276**.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
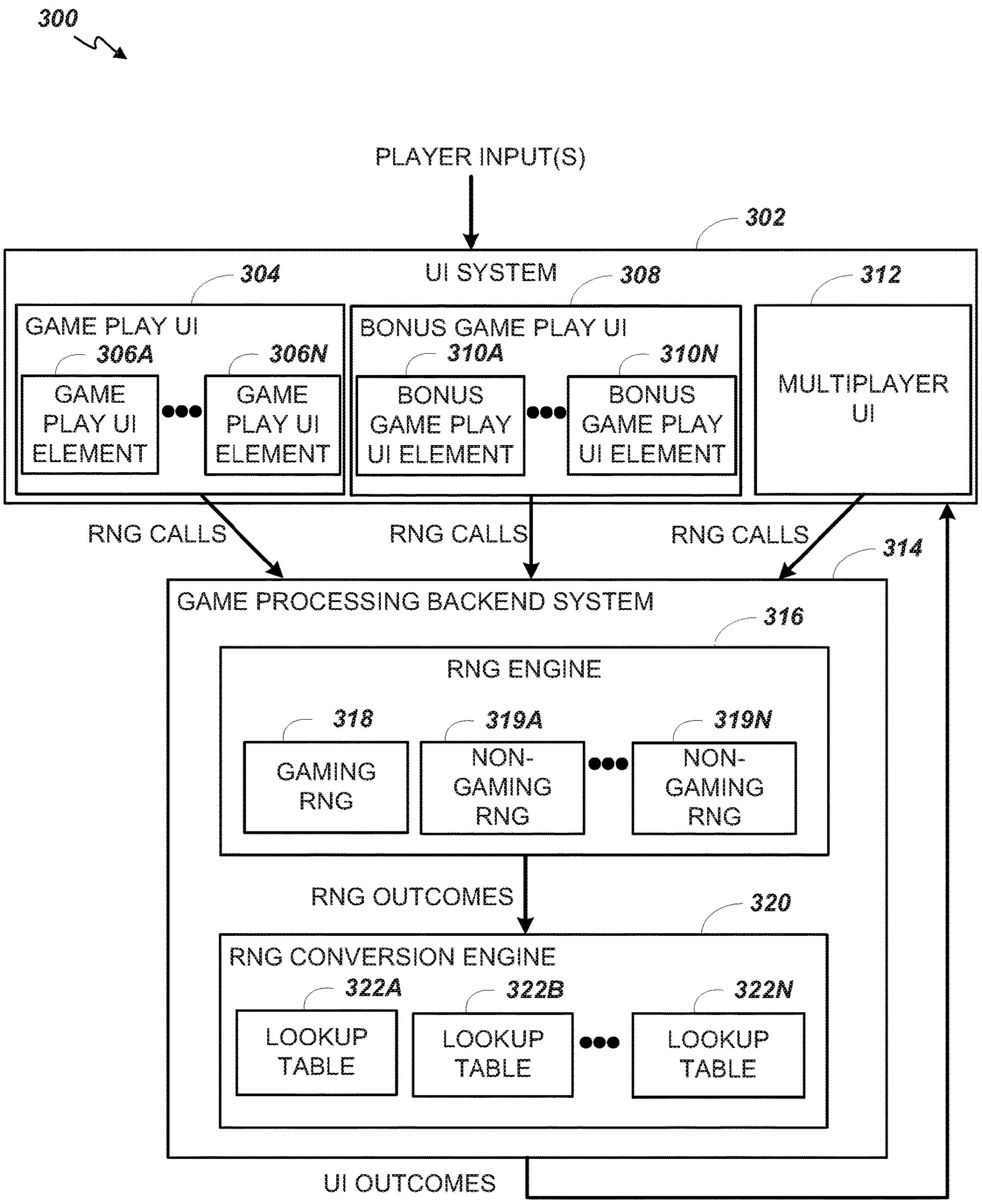
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The mechanical reels 130 shown in FIG. 1 may include one or more reel assembly(ies) 1. For example, the illustrated embodiment shown in FIG. 1 includes three reel assemblies 1, however more or less reel assemblies 1 are possible. For example the gaming device 104A could include 2, 4, 5, 6, 7, 8, or even 9 reel assemblies 1. This disclosure should not be limited to any number of reel assemblies, more or less reel assemblies 1 than articulated here are possible.

Figure 4:
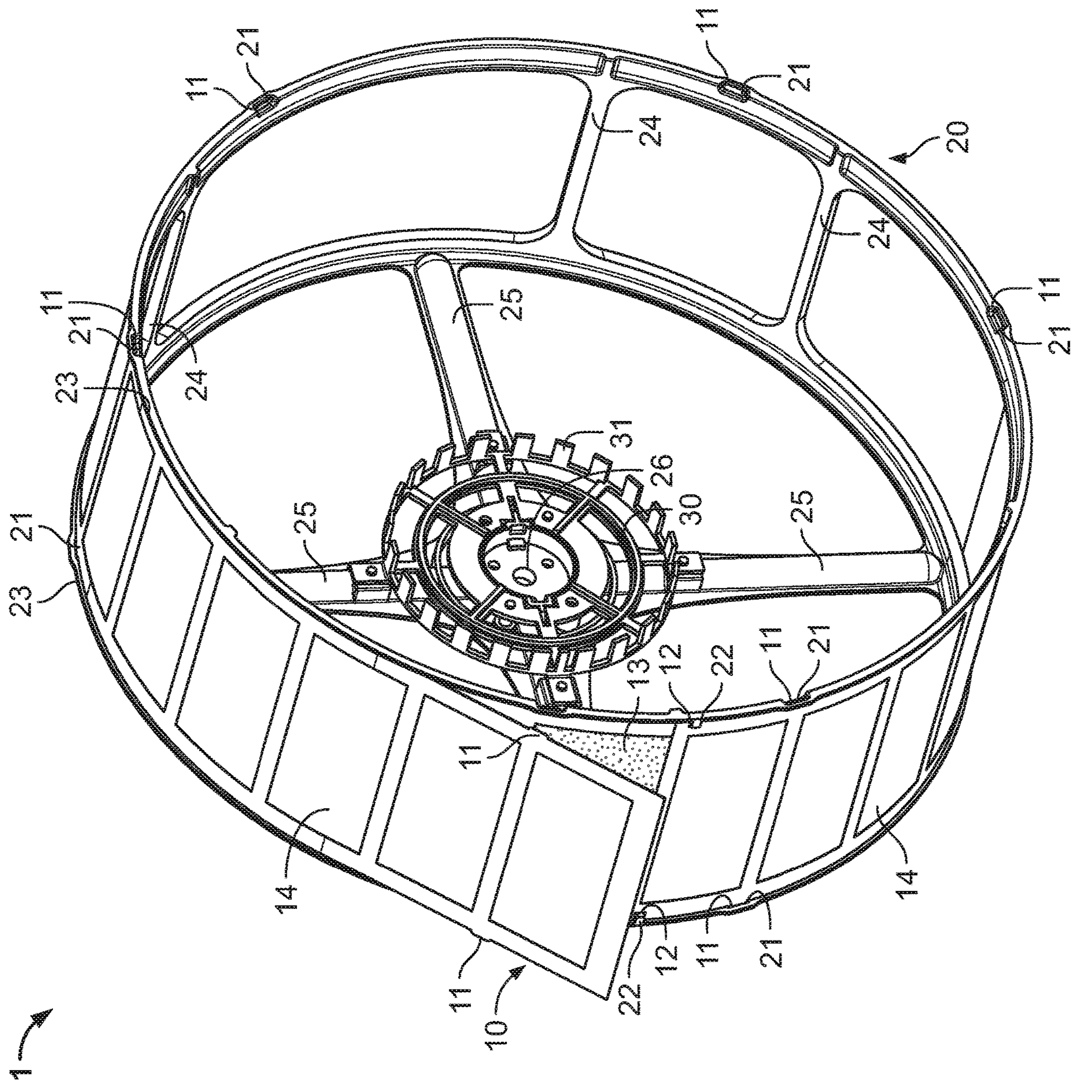
FIG. 4 is a perspective view of a reel strip and reel basket according to one example.
Figure 5:
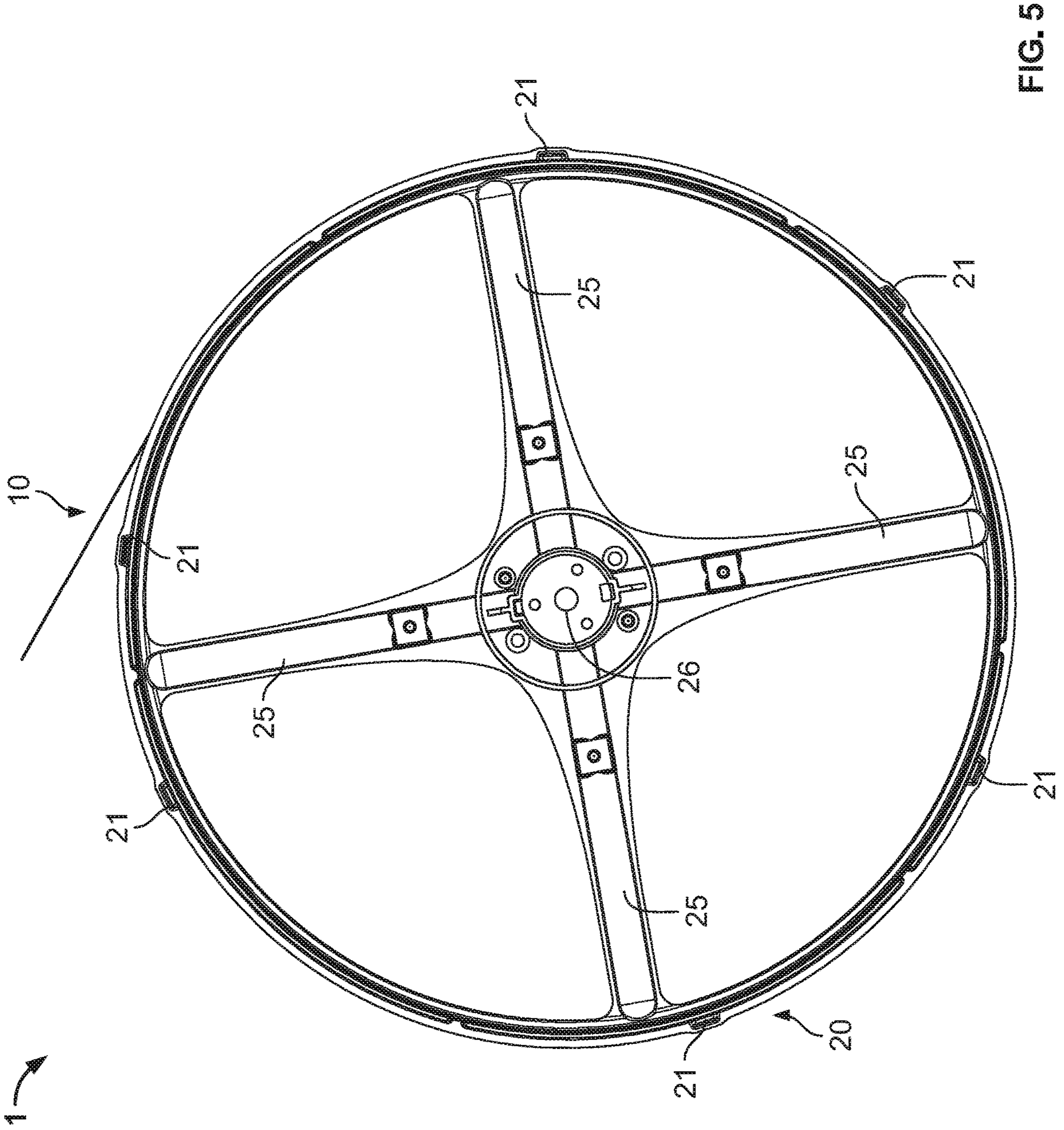
FIG. 5 is a side elevation view of a reel strip and reel basket according to one example.
Figure 6:
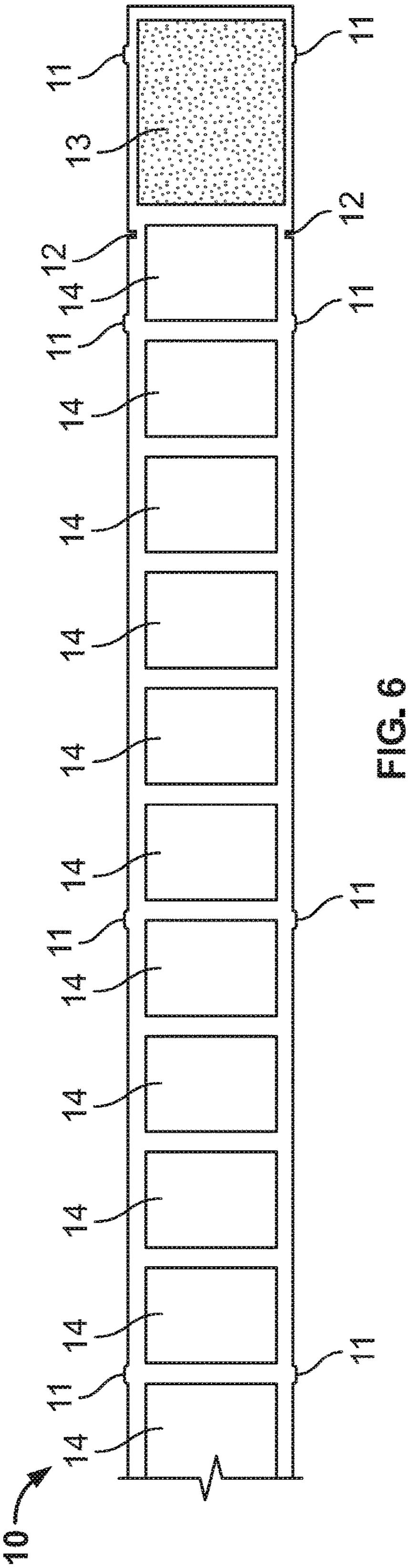
FIG. 6 is a top plan view of a reel strip according to one example.
Figure 7:
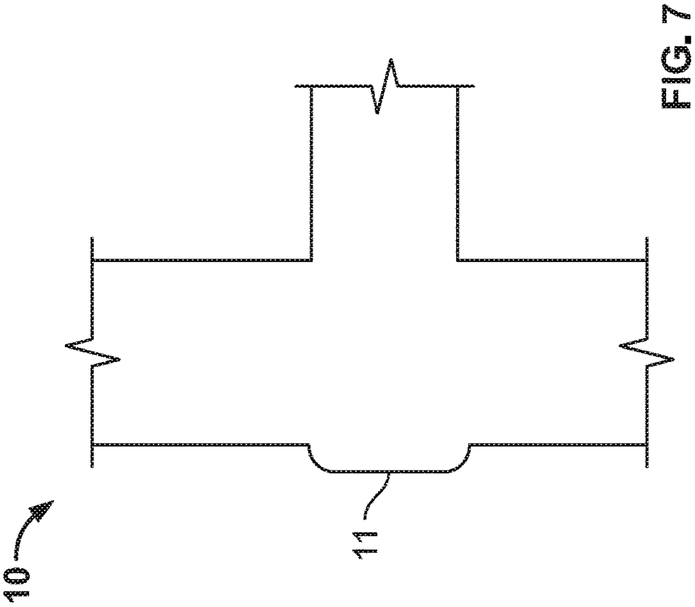
FIG. 7 is a partial close-up top plan view of the reel strip showing a tab according to one example.

An example reel assembly 1 is illustrated in FIGS. 4-5. The reel assembly 1 includes a reel strip 10, a reel basket 20, and a wheel 30. An example reel strip 10 depicted in unwound configuration is shown in FIG. 6. The exemplary reel strip 10 includes a plurality of tabs 11 projecting from both sides of the reel strip 10 (e.g., left and right sides of the reel strip 10). FIG. 7 shows a close-up of an exemplary tab 11. The term "tab" 11 as used herein can mean any extension protruding from the reel trip 10. The reel strip 10 also includes one or more indent(s) 12 positioned proximate a first end of the reel strip 10. The indent 12, as used herein refers to a cut-out portion in the reel strip 10. The reel strip 10 additionally includes an adhesive layer 13 positioned proximate either the first or the second end of the reel strip 10. Finally, the reel strip includes a plurality of graphics 14.

Figure 8:
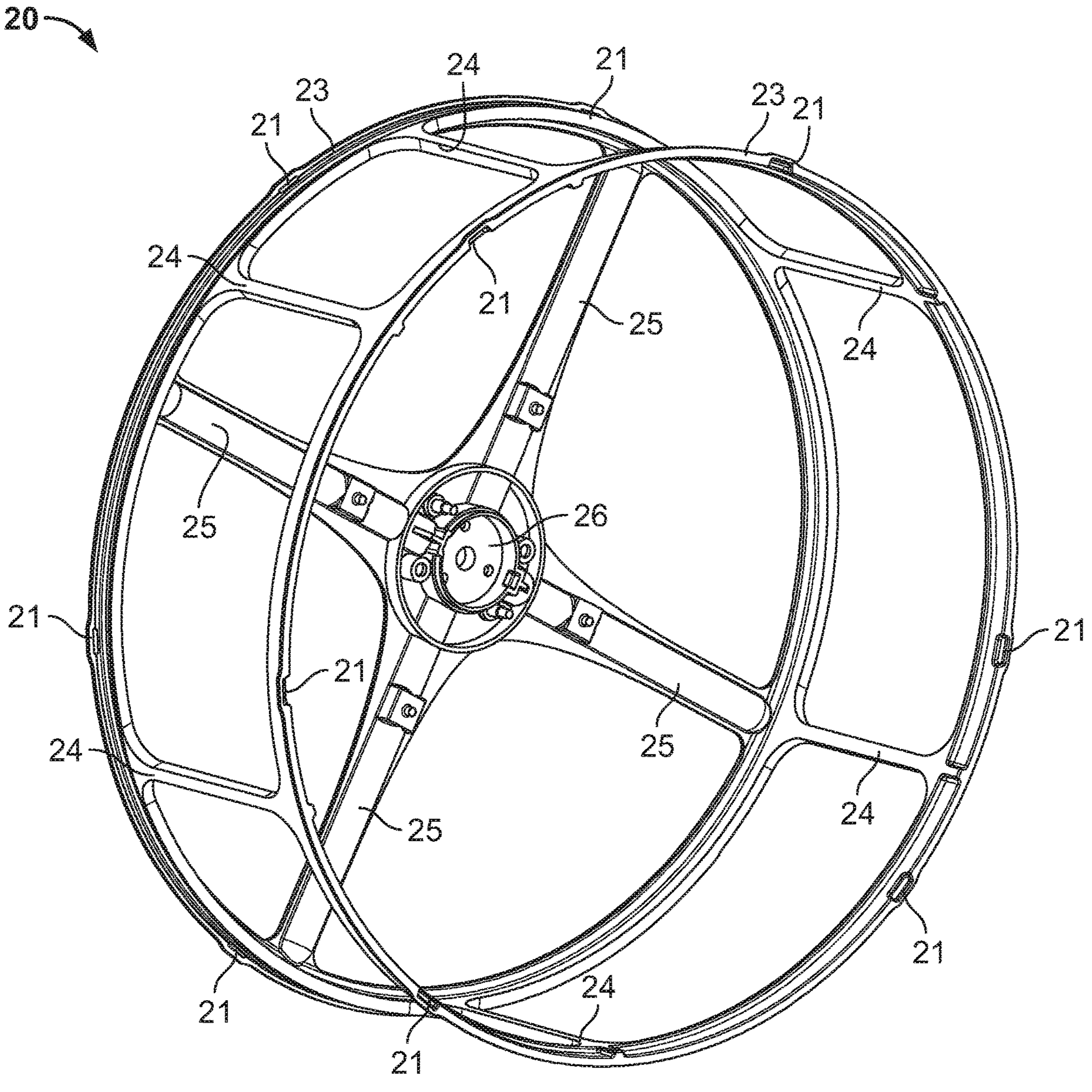
FIG. 8 is a perspective view of a reel basket according to one example.
Figure 9:
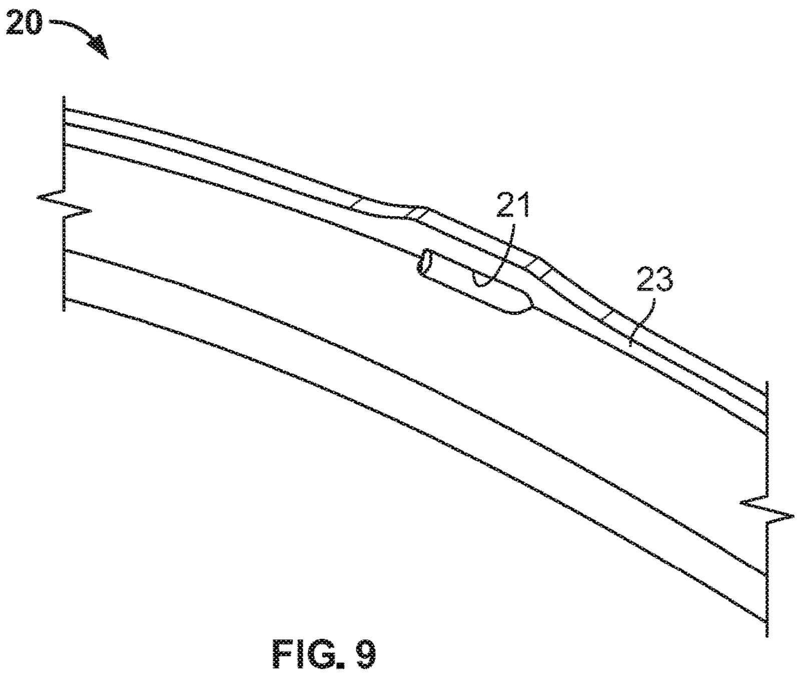
FIG. 9 is a partial close-up perspective view of the reel basket showing a slot according to one example.

An exemplary reel basket 20 of the reel assembly 1 is illustrated in FIG. 8. The reel basket includes a plurality of slots 21 positioned proximate both edges of the reel basket 20 and specifically within the two circumferential retaining walls 23 on either side (e.g., right or left sides) of the reel basket 20. FIG. 9 shows a close-up of an exemplary slot 21. The term "slot" as used herein refers generally to any type of aperture in the side of the reel strip basket 10. The specific shape of the slot 21 is not limited to the illustrated embodiments and can be any suitable shape for inserting a corresponding slot 11 of the reel strip 10.

Figure 10:
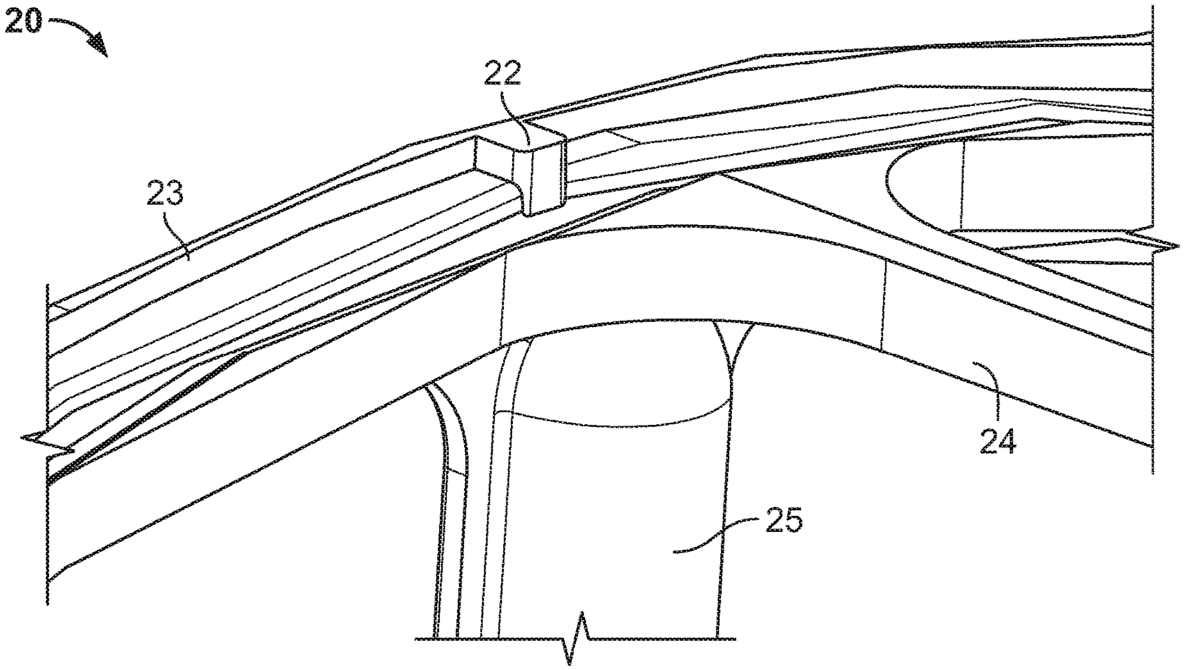
FIG. 10 is a partial close-up perspective view of the reel basket showing a detent according to one example.

The reel basket 20 also includes one or more detents 22 projecting inwardly from the retaining wall 23. FIG. 10 shows a close-up of an exemplary detent 22. The term "detent" as used herein can be any physical protrusion sized to engage with the indent 12 of the reel strip 10. Finally the reel basket 20 includes a plurality of supports 24 and arms 25 for providing structural support and rigidity to the reel basket 20. The two circumferential retaining walls 23 along with the plurality of supports 24, which can be relatively perpendicular to the plurality of arms 25, effectively create a tray for the reel strip 10 to sit in when wrapped around the reel basket 20, preventing undesirable shifting or slippage of the reel strip 10. In some embodiments (shown for example in FIG. 4), a wheel 30 including a plurality of guide tabs 31 can be attached to the reel basket 20 via the plurality of arms 25. When the reel basket 20 is attached to a motor or drive (not shown) via the drive attachment 26, the guide tabs 31 of the wheel 30 are counted by an encoder to determine the position of the reel 130.

Figure 11:
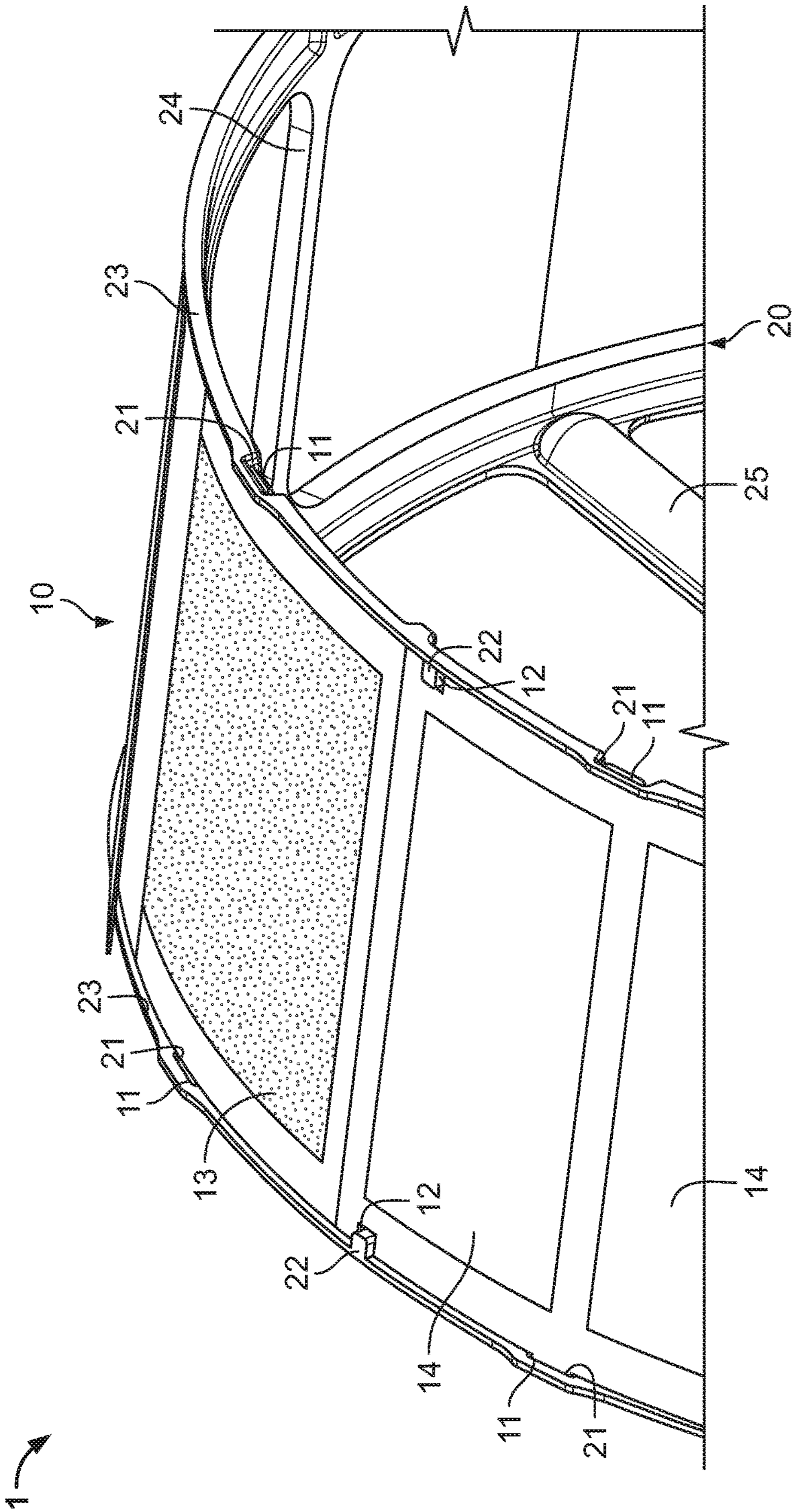
FIG. 11 is a partial close-up perspective view of the reel strip and reel basket showing the reel strip wrapped around the reel basket and the adhesive strip according to one example.
Figure 12:
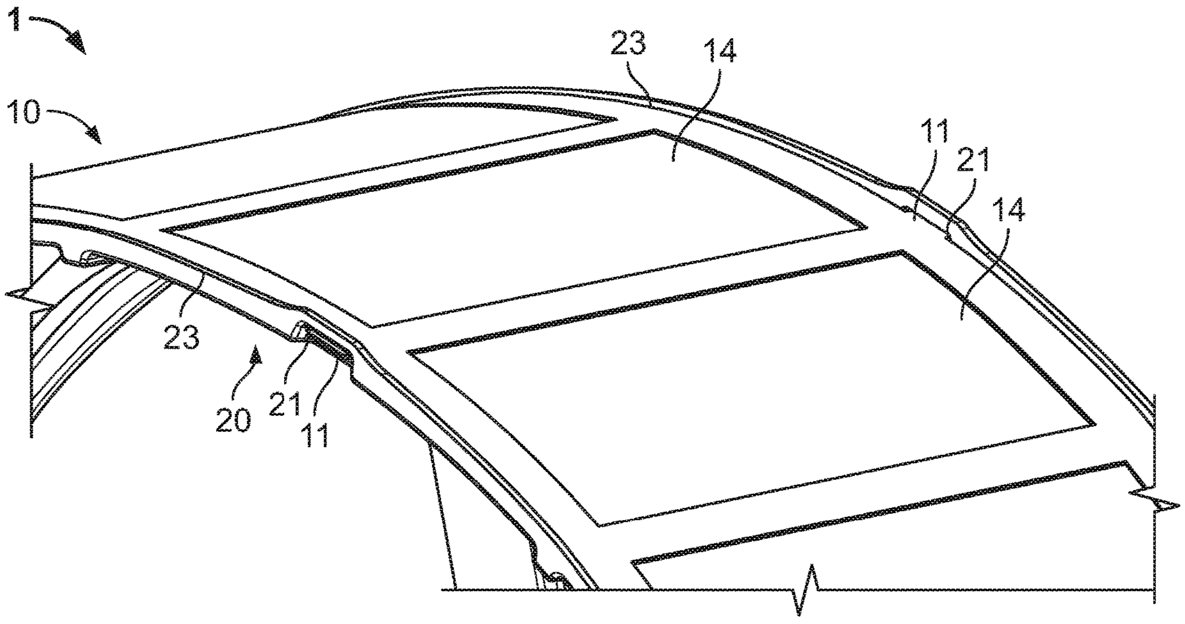
FIG. 12 is a partial close-up perspective view of the reel strip and reel basket showing the tabs of the reel strip positioned in the slots of the reel basket according to one example.

Shown for example in FIGS. 11 and 12, the one or more tabs 11 of the reel strip 10 engage with (e.g., are inserted to) the corresponding one or more slots 21 positioned around the edge, and within the retaining walls 23, of the reel basket 20. This engagement mechanically fastens the reel strip 10 to the reel basket 20 and ensures that the weight of the reel strip 10 is distributed evenly. In other words, because the reel strip 10 is mechanically fastened in multiple locations around the reel basket 20, when the reel assembly 1 spins, the centrifugal force is distributed more evenly than if the reel strip 10 had only a single point of attachment to the reel basket 20. The use of slots 21 positioned in a retaining wall 23 to secure the reel strips 10 also contributes to an attractive reel assembly 1 because the mechanical fastening means are subtle and unobtrusive.

Also shown in FIG. 11, is the engagement of the detents 22 of the reel basket 20 with the indents 12 of the reel strip 10. The detent 22 securely nests, couples, or links into the indent 12 of the reel strip 10. The detents 22 indicate the starting position of the reel strip 10. Further, the spacing between the detents 22 and the slots 21 is unidirectional and offset. Therefore, when the indents 12 are engaged with the detents 22, the orientation of the reel strip 10 is determinable by wrapping (or partially wrapping) the reel strip 10 around the reel basket 20 and seeing if the tabs 11 of the reel strip 10 line up with the slots 21 of the reel basket 20. Stated another way, the tabs 11 will only line up with the slots 21 when the reel strip is oriented or positioned unidirectionally in the correctly assembled position.

The reel strip 10 can be made of any thin, flexible translucent or transparent material for example plastic. The material should be suitable for applying graphics 14. The graphics 14 can be of almost any design and may be applied to reel strip 10 by any method that results in a suitable color depth, image clarity and fastness. Optionally, the reel strip 10 may comprise a base layer (not shown) and an overlay strip (not shown). The reel basket 10 can be made of any suitable material, for example plastic or other polymers. The reel basket 10 may be translucent or transparent to avoid dark spots from internal lighting (not show) when the reel assembly 1 spins. The reel basket 20 may be made by any method that results in a suitable and structurally-sound reel basket 20. In one example, the reel basket 20 is injection molded using a cavity and core tooling.

The presently disclosed reel retention system also has certain manufacturing benefits. For example, the reel strip 10, including all tabs 11 and indents 12, are laser cut or die cut from a single piece of material. Likewise, the slots 21 and detents 22 are embedded in the cavity and core of the tooling. Thus, unlike conventions mechanical reels, the system disclosed herein does not require any additional manufacturing steps to create the fastenings means to fasten the reel strip 10 to the reel basket 20.

The illustrated embodiment depicts a preferred number of tabs 11, indents, 12, slots 21, and detents 22. For example, the illustrated embodiments include: a total of fourteen units of tabs 11, such that seven units of tabs 11 are positioned on each side of the reel strip 10; two units of indents 12, positioned proximate the first end and on both sides of the reel strip 20; a total of twelve units of slots 21, such that six units of slots 21 are positioned in a staggered arrangement (seen most clearly in FIG. 5) on each side of the reel basket 20; and two units of detents 22 indicating the starting position of the reel strip. In the preferred embodiment, the first set and the last set of tabs 11 are inserted into the same slot 21 when the reel strip 10 is fully wrapped around the reel basket 20.

It is however understood, that more or fewer tabs 11 and corresponding slots 21 are contemplated by the present disclosure. For example, the reel strip 10 could include as few as a single tab 11 positioned on one side of the reel strip 10 and a single corresponding slot 21. The present disclosure also contemplates any other number or combination of tab(s) 11 positioned on one or both sides of the reel strip 10 and corresponding slots 21. Additionally, the tabs 11 and slots 21 are not required to be paired as illustrated. For example, the reel strip 10 can have five units of tabs 11 on one side and six units of tabs 11 on the other side, etc. Likewise, the spacing of the slots 21 along the circumference of the reel basket 20 is not limited to the illustrated embodiment. The present disclosure contemplates any number of slots 21 positioned at any location on the reel basket 20.

The present disclosure should also not be limited to the exact shape of the tab 11 shown in the figures, as the shape shown is just one of many possible reel tab 11 shapes. Alternative tab shapes are contemplated and the present disclosure considers tab shapes including, but not limited to, rectangular, trapezoidal, triangular, rounded, etc. It is noted that it may be advantageous for the tab 11 to include a taper or rounded edge to facilitate ease of insertion into the slot(s) 21 positioned around the reel basket 20.

Likewise, it is understood that the present disclosure contemplates more or fewer indents 12 and detents 22 than illustrated. For example, the reel strip 10 could include only a single unit of indent 12 or three or four units of indents 12 (and corresponding units of detents 22 on the reel basket 20). Likewise, the indents 12 while being illustrated as being located at the same position on either side of the reel strip 10 (i.e., inline) could be arranged differently (i.e., offset). For example, the indents 12 could be positioned in a "keyed" formation to ensure that only a reel strip with the correct "key" arrangement of indents 12 can be used with a particular reel basket 20. Such an alternative configuration could also be used to indicate the correct orientation of the reel strip 10 relative to the reel basket 20. The reel strip 10 is therefore ensured to be installed into the reel basket 20 in an assembled orientation, wherein the assembled orientation comprises at least: (1) tabs 11 operatively connected to corresponding slots 21 and (2) indents 12 operatively connected to corresponding detents 22.

Additionally, the present disclosure contemplates that the tabs 11 and slot 21 could be inversed. Put differently, the reel basket 20 could include some tabs (not shown) that engage with slots (not shown) in the reel strip. Likewise, the indent 12 and detent 22 could be reversed. For example, the reel strip 10 could include detent (e.g., a different shaped tab (not shown)) that engages with an indent (e.g., a different shaped slot (not shown)) in the reel basket 20, indicating the correct starting location of the reel strip 10 relative to the reel basket 20. The unidirectional spacing of the remaining tabs 11 and slots 21 still apply to such an alternative embodiment, ensuring that the reel strip 10 can only be installed in a single correct orientation. Stated another way, the tabs 11 can only line up with the slots 21 when the reel strip 10 is oriented or positioned unidirectionally in a correctly assembled position. The reel strip 10 is therefore ensured to be installed into the reel basket 20 in an assembled orientation, wherein the assembled orientation comprises at least: (1) tabs 11 operatively connected to corresponding slots 21 and (2) indents 12 operatively connected to corresponding detents 22.

Finally, the present disclosure contemplates alternative means, other than the use of an adhesive layer 13, of adhering the first end of the reel strip 10 to the second end of the reel strip 10. For example, one embodiment could include two tabs 11 (and corresponding slots 21 in the reel basket) positioned at the very end of the second end of the reel strip. Thus, when the reel strip 10 is fully wrapped around the reel basket 20, the free second end is fastened to the reel basket by the last two tabs 11. Another embodiment could utilize heat pressing the first end and second ends of the reel strip 10 together. Yet another embodiment could utilizes "cereal box" type of tabs on the first and second ends of the reel strip 10. In such an embodiment the two ends of the reel strip 10 would tuck into each other when the reel strip 10 is fully wrapped around the reel basket 20.

Figure 13:
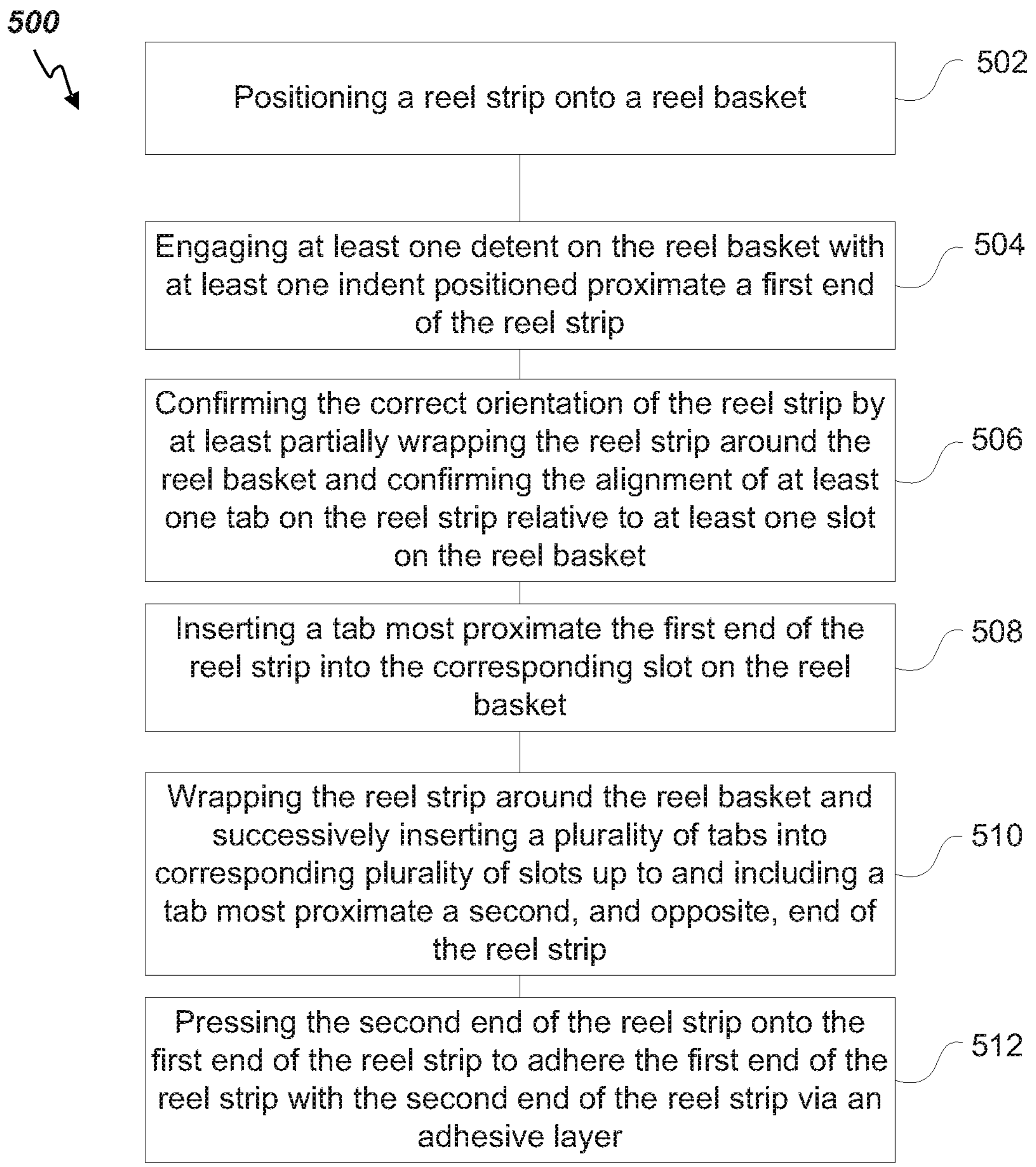
FIG. 13 is a flowchart of a method of attaching a reel strip to a reel basket according to one example.

FIG. 13 provides a method 500 for installing a reel strip 10 onto a reel basket 20. In block 502 the reel strip 10 is positioned onto the reel basket 20. For example, the reel strip 10 is positioned between the two circumferential retaining walls 23 on the reel basket 20.

In block 504 at least one detent 22 on the reel basket is engaged with at least one indent 12 positioned proximate a first end of the reel strip 10. For example, in the illustrated embodiment the detent 22 nests in the space created by indent 12. The engagement between the detent 22 of the reel basket 20 and the indent 12 of the reel strip 10 determines the starting position for the reel strip 10.

In Block 506, the correct orientation of the reel strip 10 for correct or proper assembly of the reel strip 10 with the reel basket 20 is confirmed by at least partially wrapping the reel strip 10 around the reel basket 20 and confirming the alignment of at least one tab 11 on the reel strip relative to at least one slot 21 on the reel basket 21. For example, in the illustrated embodiments, the slots 21 are positioned relative to the detent 22 such that reel strip 10 can only be installed in a single (and correct) direction for all tabs 11 to line up with all of the slots 21.

In Block 508, a tab 11 most proximate the first end of the reel strip 10 is inserted into the corresponding slot 21 on the reel basket 20. In the exemplary illustrated embodiment, the reel strip 10 has two tabs 11, one on each side, positioned proximate the first end of the reel strip 10. The combination of the first tab(s) 11 being inserted into the corresponding slots 21 and the detent 22 of the reel basket 20 being previously engaged with the indent 12 of the reel strip "anchors" the reel strip 10 to the reel basket 20. Therefore, the reel strip 10 can be efficiently wrapped around the reel basket 20 without risk of the first end of the reel strip 10 coming off the reel basket 20.

In Block 510, the reel strip 10 is wrapped around the reel basket 20 and a plurality of tabs 11 are successively inserted into corresponding plurality of slots 21 up to and including a tab 11 most proximate a second, and opposite, end of the reel strip 10. For example in the illustrated embodiment including at total of fourteen tabs 11 (seven on each side of the reel strip 10), once the first set of tabs 11 proximate the first end of the reel strip are inserted into their corresponding slots 11 of the reel basket, the remaining tabs 11 are inserted sequentially in the following order: second set, third set, fourth set, fifth set, sixth set, and seventh set (most proximate the second, and opposite, end of the reel strip 10). When the reel strip 10 is wrapped the reel basket 20 and the plurality of tabs 11 are successively inserted into the corresponding plurality of slots 21 up to and including the tab 11 most proximate the second, and opposite, end of the reel strip 10, the reel strip 10 can reside within and against, for example, the outermost inner perimeter of the retaining walls 23 of reel basket 20. Stated another way, reel strip 10 can make a supple, stable fit with reel basket 20 against the retaining walls 23.

In Block 512, the second end of the reel strip 10 is pressed onto the first end of the reel strip 10 to adhere the first end of the reel strip 10 with the second end of the reel strip 10 via an adhesive layer 13. The adhesive layer 13, may first require the removal of a release backing (not shown) to reveal the adhesive layer 13. It is understood that while the illustrated embodiment show the adhesive layer 13 positioned on the reel strip 10 proximate the first end, the adhesive layer could also be positioned the opposite second end of the reel strip 10.

The reel strip 10 is operatively connected to, i.e., wrapped around, the reel basket 20 to form the reel assembly 1 that can be mounted on a reel mount assembly. The reel mount assembly may be configured to support multiple reel configurations (e.g., 5 reels, 4 reels, 3 reels, etc.), with the reel mount assembly being configurable between at least a three (3) reel and a five (5) reel configuration. The reel mount assembly, which mounts the reel assembly 1, can provide the: (i) a configurable reel mounting system that can easily be adjusted to accommodate five (5) reels or three (3) reels without needing to remove and/or replace parts within the electronic gaming machine cabinet; (ii) a configurable reel mounting system with adjustable panels that can be manually moved between different reel configurations without the use of tools; and (iii) a configurable reel mounting system that can be universally used with electronic gaming machines including three (3) reel and/or five (5) reel machines.

Figure 14:
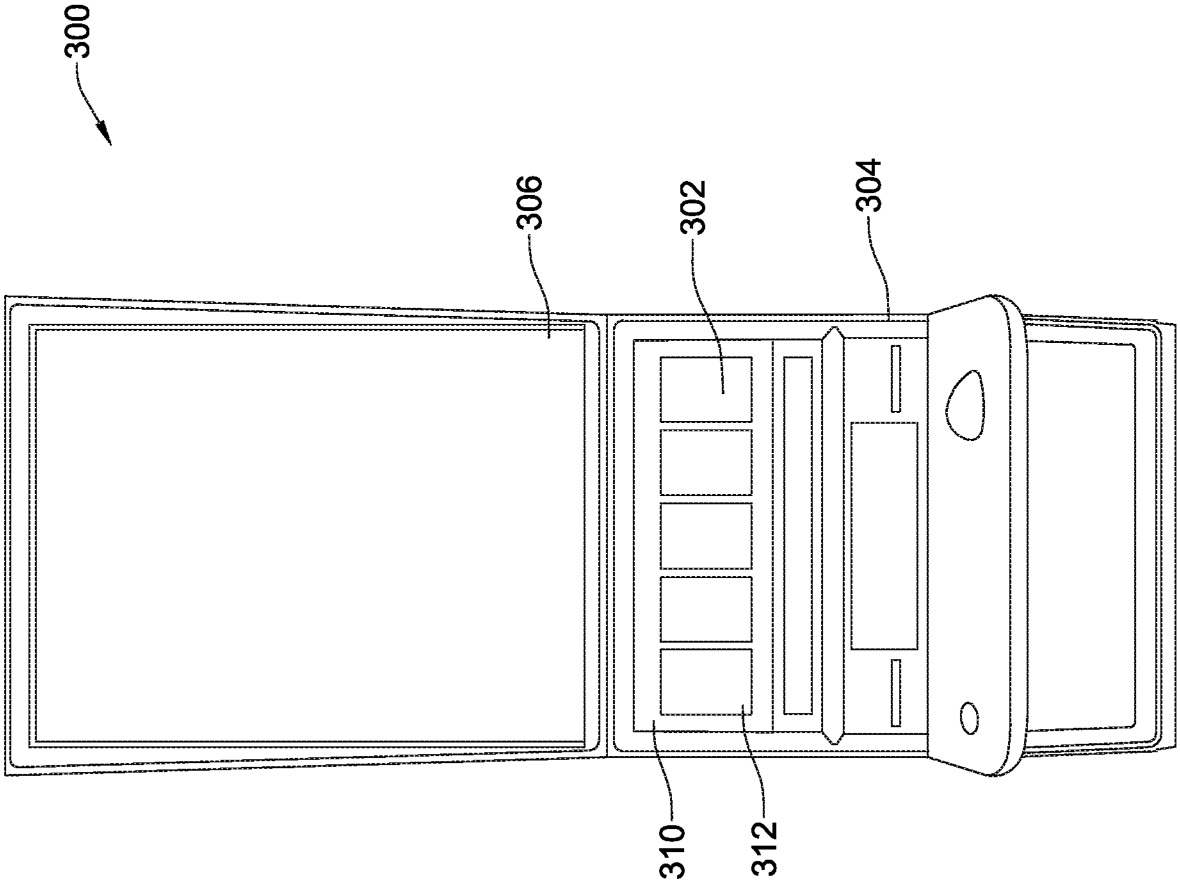
FIG. 14 is a front view of an EGM with an example reel mount assembly in accordance with one embodiment of the present disclosure.

FIG. 14 is a front view of an example gaming machine 300 with a configurable reel mount assembly 302 in accordance with the present disclosure. In some embodiments, reel mount assembly 302 may be installed on an EGM such as gaming devices 104A-104X, 256, and/or 264*a*-264*c*. In the example embodiment, the gaming machine 300 includes a cabinet 304 and a display device 306. The cabinet 304 may house a plurality of reel slots 308 (shown in FIG. 15) positioned behind a reel display panel 310. The reel display panel 310 includes a plurality of reel windows 312, through which a reel mechanism within each of the plurality of reel slots 308 (shown in FIG. 15) is visible.

Figure 15:
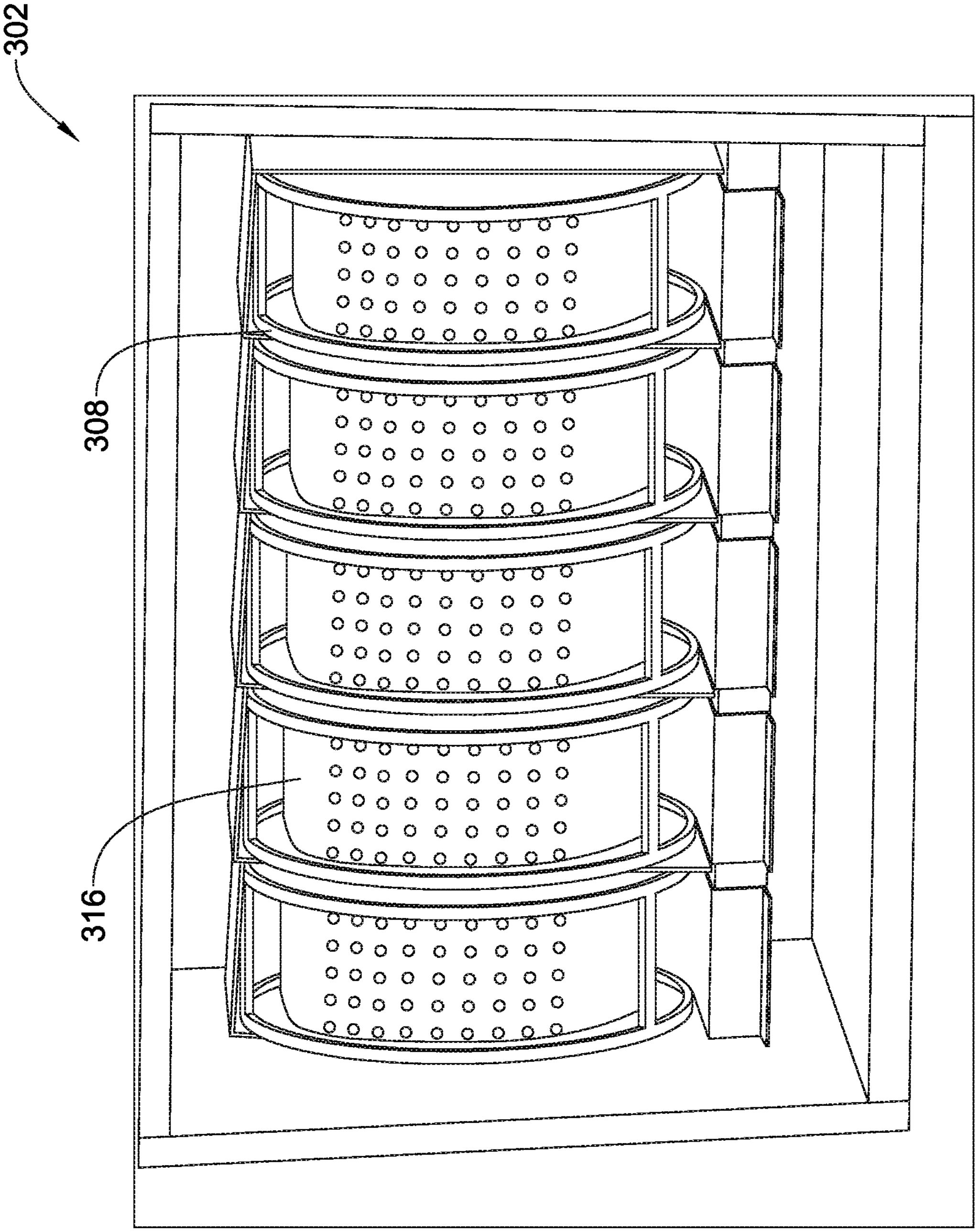
FIG. 15 is a front view of the example reel mount assembly shown in FIG. 14 with a five (5) reel configuration in place.

In an example embodiment, the reel mount assembly 302 is configurable to support multiple reel configurations for mounting reel assembly 1. More specifically, in the example embodiment, the reel mount assembly 302 is configurable to support a first reel configuration including five (5) of the reel slots 308 (shown in FIG. 15) and a second reel configuration including three (3) of the reel slots 308. As shown in FIGS. 14 and 15, the reel mount assembly 302 may be configured to support the first reel configuration including five of the reel slots 308.

Figure 16:
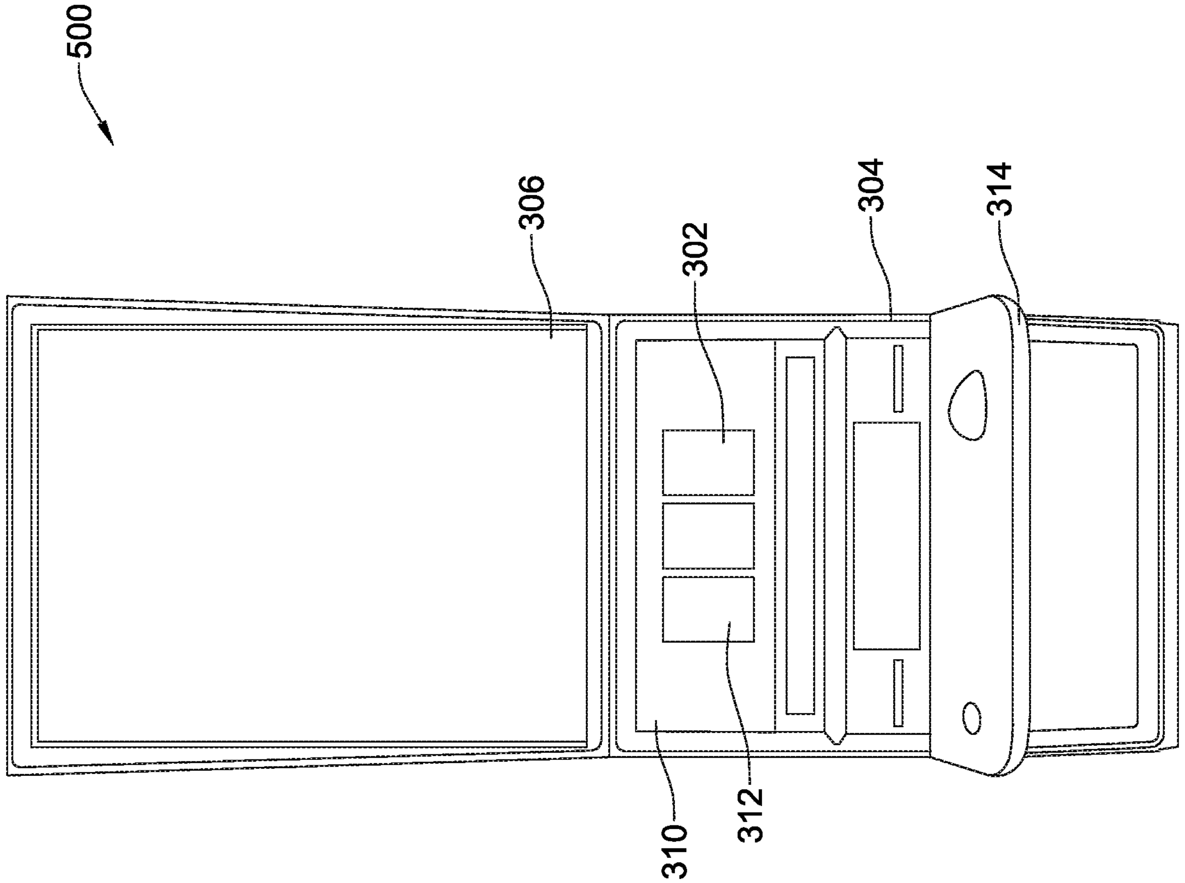
FIG. 16 is a front view of an EGM with an example reel mount assembly positioned within the EGM.
Figure 17:
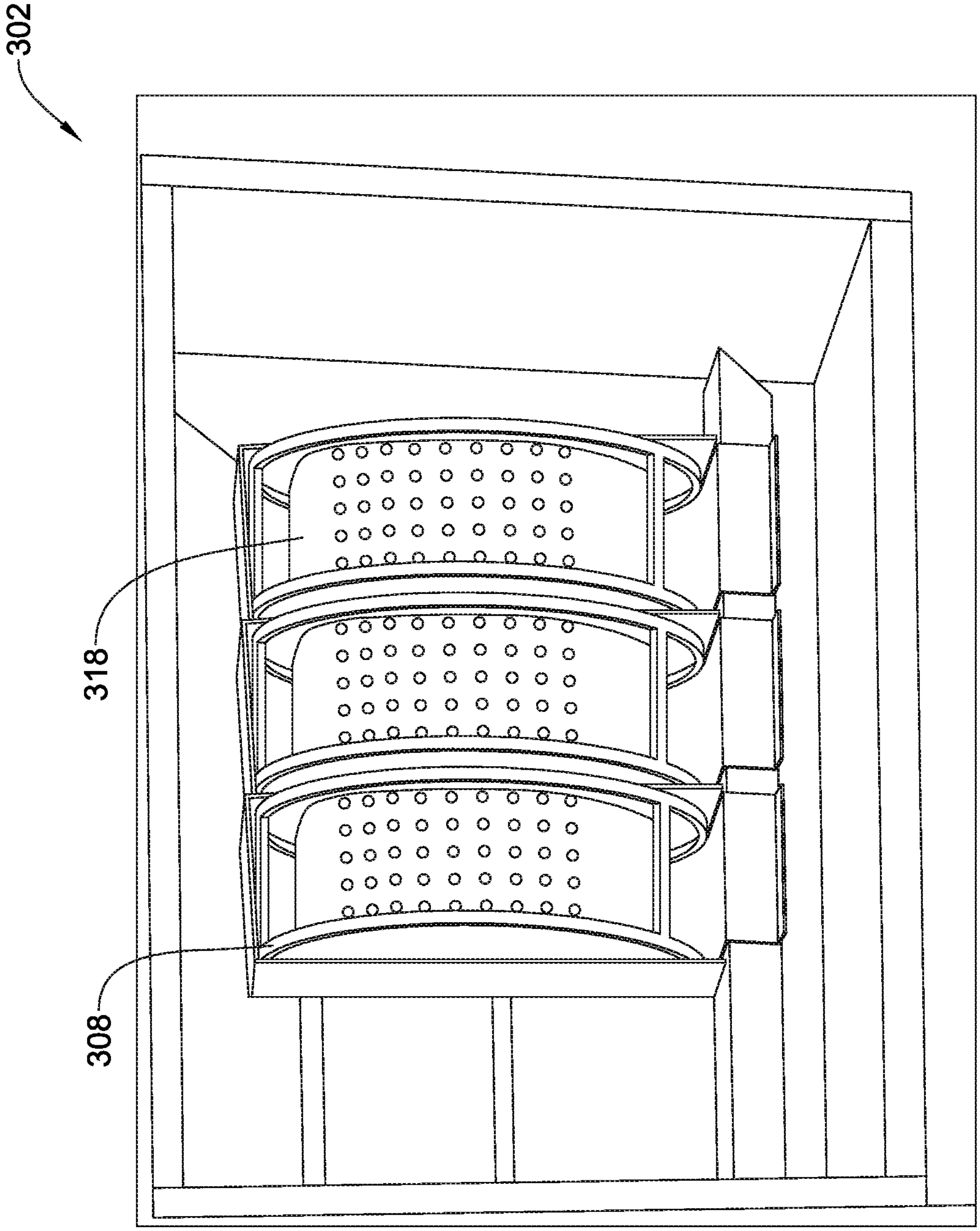
FIG. 17 is a front view of the example reel mount assembly shown in FIG. 16 with a three (3) reel configuration in place.

FIG. 16 is a front view of the reel mount assembly 302 for use with the gaming machine with reel display panel 310 removed showing the reel mount assembly 302 in the three (3) reel configuration. As shown in FIG. 17, the reel mount assembly may be configured to support three (3) reel slots 308 in the second reel configuration. In the example embodiment, the second reel configuration is configured to accommodate a second reel mechanism 318 within each of the reel slots 308. In some embodiments, the second reel mechanism 318 may have a width of about 95 millimeters (mm). In other embodiments, the second reel mechanism 318 may have a width less than or greater than 95 mm.

The width of the first reel mechanism 316 (shown in FIG. 15) may be less than the width of the second reel mechanism 318 (shown in FIG. 17), such that the first reel mechanism 316 (shown in FIG. 15) may be described as being narrower than the second reel mechanism 318 (shown in FIG. 17). Thus, the reel mount assembly 302 may accommodate an increased number of the first reel mechanism 316 (shown in FIG. 15) than of the second reel mechanism 318 (shown in FIG. 17) based on the narrower profile of the first reel mechanism 316.

Figure 18:
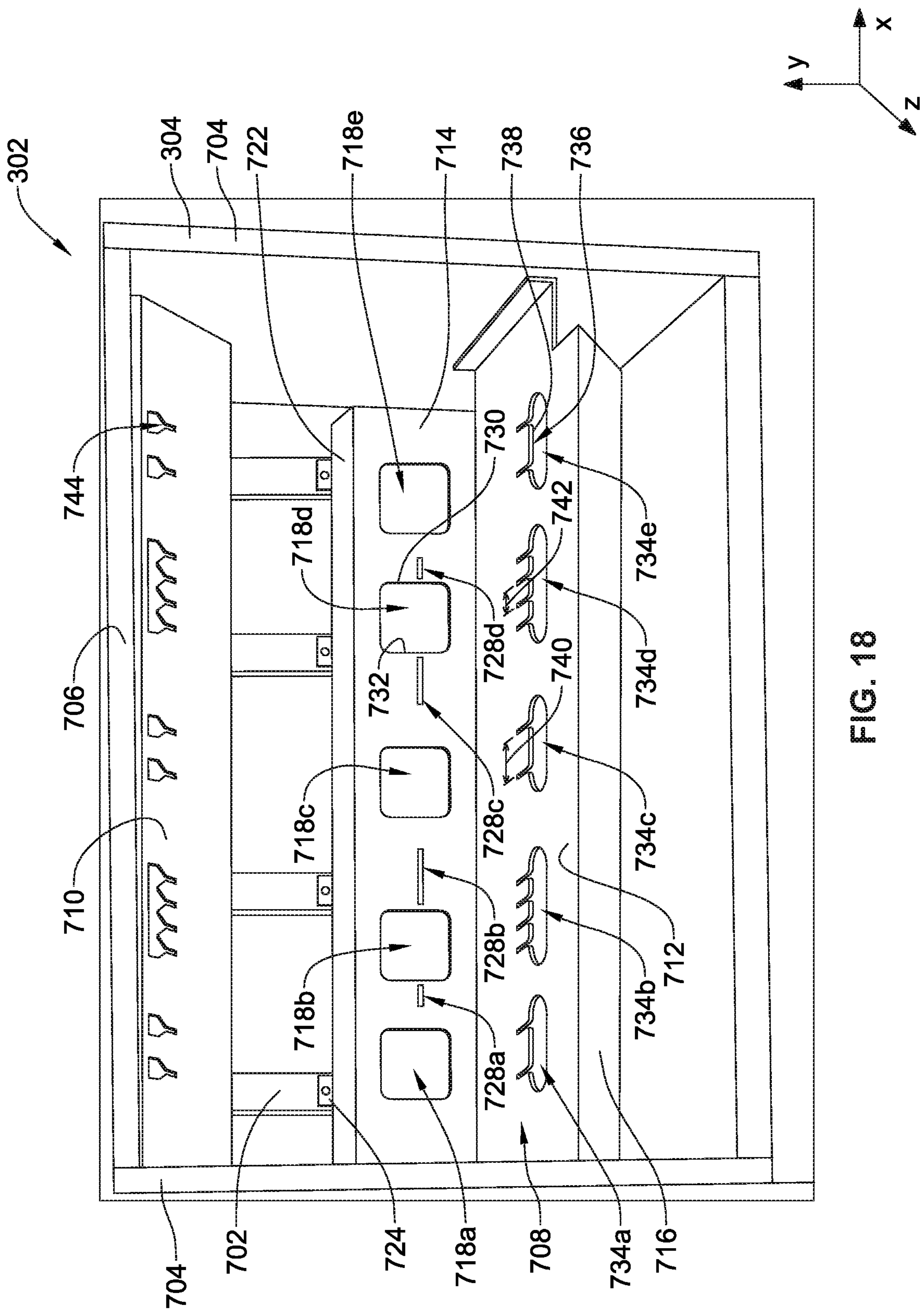
FIG. 18 is a front view of an example reel mount assembly with the reels removed.

FIG. 18 is a front view of the reel mount assembly 302 within the cabinet 304 with the reel mechanisms 318 removed so that the reel mounting locations are visible. In the example embodiment, the cabinet 304 includes a back wall 702 between a pair of side walls 704. The side walls 704 and the back wall 702 extend vertically along the y-plane, with the side walls 704 being substantially perpendicular to the back wall 702. In the example embodiment, the cabinet 304 also includes a top wall 706 between the pair of side walls 704. The top wall 706 extends horizontally along the x-z plane, with the top wall 706 being substantially perpendicular to the back wall 702 and the side walls 704. In the example embodiment, a cavity 708 is defined by the back wall 702, the side walls 704, and the top wall 706.

In the example embodiment, the reel mount assembly 302 includes a top panel 710, a bottom panel 712, and a back panel 714. The bottom panel 712 extends between the side walls 704 of the cabinet 304, the bottom panel 712 extending horizontally along the x-z plane and being substantially parallel to the top wall 706 of the cabinet 304. The bottom panel 712 may have a front lip 716 that extends vertically along the y-plane, the front lip 716 being substantially perpendicular to the bottom panel 712 and substantially parallel to the back wall. The back panel 714 extends between the side walls 704 of the cabinet, the back panel 714 extending vertically along the y-plane and being substantially parallel to the back wall 702.

The bottom panel 712 may be secured within the cabinet 304 by any means known in the art that facilitates the systems described herein. For example, in some embodiments, the bottom panel 712 may be secured to each of the side walls 704 via one or more fasteners, such as, but not limited to, screws. Additionally, for example, in other embodiments, the bottom panel 712 may slide into tracks along each of the side walls 704. The panels of the reel mount assembly 302 (e.g., the top panel 710, the bottom panel 712, and/or the back panel 714) may be manufactured from a metal material to facilitate improving the rigidity and durability of the reel mount assembly 302.

The bottom panel 712 may have a substantially rectangular shape, with a length dimension along the x-direction that is greater than a width dimension along the z-direction. The back panel 714 may also have a substantially rectangular shape, with a length dimension along the x-direction that is greater than a width dimension along the y-direction. Additionally, the top panel 710 may have a substantially rectangular shape, with a length dimension along the x-direction that is greater than a width dimension along the y-direction. In some embodiments, the bottom panel 712, the back panel 714, and/or the top panel 710 may have a different shape.

In the example embodiment, the top panel 710 extends from the back wall 702 of the cabinet at an angle $\alpha$ greater than 90° (shown in FIG. 20), such that the top panel 710 may be described as extending "away from" the bottom panel 712. Additionally, in the example embodiment, the top panel 710 extends from the top wall 706 of the cabinet at an angle (3 greater than 90° (shown in FIG. 20), such that the top panel 710 may be described as extending "away from" the top wall 706.

In the example embodiment, the back panel 714 includes a plurality of back apertures 718. As shown in FIG. 18, the plurality of back apertures 718 may include a first back aperture 718a, a second back aperture 718b, a third back aperture 718c, a fourth back aperture 718d, and/or a fifth back aperture 718e. The back apertures 718 may vary in size and shape. For example, in some embodiments, one or more of the back apertures 718 may have an approximate square shape with rounded corners. Additionally, for example, in other embodiments, one or more of the back apertures 718 may have a different shape. In the example embodiment, the back panel 714 is offset from (e.g., not in face-to-face contact with) the back wall 702 of the cabinet 304 (shown in FIG. 20) to provide space for wiring 720 (shown in FIG. 19) that connects with the reel mechanism within each reel slot 308 through the respective back aperture 718.

The back panel 714 may have a top lip 722 that extends horizontally along the x-z plane, the top lip 722 being substantially perpendicular to the back panel 714 and substantially parallel to the bottom panel 712. The top lip 722 may be secured to the back wall 702 by any means known in the art that facilitates the systems described herein. For example, in some embodiments, the top lip 722 may include one or more tabs 724 that extend substantially perpendicular to the top lip 722 and substantially parallel to the back panel 714 for securing the back panel 714 to the back wall 702 via one or more fasteners. The one or more tabs 724 may vary in size and shape.

In the example embodiment, the back panel 714 includes a plurality of channels 728 proximate to one or more of the plurality of back apertures 718. As shown in FIG. 18, the plurality of channels 728 may include a first channel 728a, a second channel 728b, a third channel 728c, and/or a fourth channel 728d. The plurality of channels 728 may be proximate to the second and fourth back apertures 718b, 718d, as shown in FIG. 18. For example, the first and second channels 728a, 728b may be proximate to the second back aperture 718b. Additionally, for example, the third and fourth channels 728c, 728d may be proximate to the fourth back aperture 718d.

One or more of the plurality of channels 728 may extend from one or more of the plurality of back apertures 718. For example, the first and fourth channels 728a, 728d may extend from an outer edge 730 of the respective back aperture 718, such that the first and fourth channels 728a, 728d may be described as extending "towards" the respective side wall 704. The first and fourth channels 728a, 728d may vary in size and shape. For example, the first and fourth channels 728a, 728d may be a narrow rectangle shape with a rounded end nearest the respective side wall 704. Additionally, for example, the first and fourth channels 728a, 728d may have a taper end that connects to the respective back aperture 718.

Additionally, for example, the second and third channels 728b, 728c may be proximate to an inner edge 732 of the respective back aperture 718, such that the second and third channels 728b, 728c may be described as extending "towards" a center of the back panel 714. The second and third channels 728b, 728c may vary in size and shape. For example, the second and third channels 728b, 728c may be a narrow rectangle shape with a rounded end nearest the respective back aperture 718. Additionally, for example, the second and third channels 728b, 728c may have a circular end furthest from the respective back aperture 718.

In the example embodiment, the bottom panel 712 includes a plurality of bottom apertures 734. The bottom apertures 734 may vary in size and shape. For example, in some embodiments, one or more of the bottom apertures 734 may have an approximate oval shape. Additionally, for example, one or more of the bottom apertures 734 may have a different shape. As shown in FIG. 7, the plurality of bottom apertures may include a first bottom aperture 734a, a second bottom aperture 734b, a third bottom aperture 734c, a fourth bottom aperture 734d, and a fifth bottom aperture 734e.

One or more of the plurality of bottom apertures 734 may have one or more slits 736 extending from a back edge 738 of the bottom aperture 734, such that the slits 736 may be described as extending "towards" the back panel 714. As shown in FIG. 18, each of the first, third, and fifth bottom apertures 734*a*, 734*c*, 734*e* may have two of the slits 736 extending from the respective back edge 738, with the slits 736 separated by a first width 740. In some embodiments, the first width 740 may be in a range of from about 20 mm to about 100 mm. Additionally, as shown in FIG. 7, each of the second and fourth bottom apertures 734*b*, 734*d* may have four of the slits 736 extending from the respective back edge 738, with the slits 736 separated by a second width 742. In some embodiments, the second width 742 may be in a range of from about 20 mm to about 60 mm.

In the example embodiment, the first width 740 may be greater than the second width 742, such that the slits 736 separated by the second width 742 may be described as being "closer together" than the slits 736 separated by the first width 740. Thus, the second and fourth bottom apertures 734*b*, 734*d* may have an increased number of slits 736 extending from the respective back edge 738 based on the decreased width between the slits 736.

In the example embodiment, the top panel 710 includes a plurality of slots 744. The slots 744 may vary in size and shape. For example, in some embodiments, one or more of the plurality of slots 744 may have an approximate rectangle shape, with a rounded end nearest a bottom edge 746 of the top panel 710 and a circular end nearest the top wall 706 of the cabinet. Additionally, for example, in other embodiments, one or more of the plurality of slots 744 may have a different shape. As shown in FIG. 18, the top panel 710 may include a matching number of slots 744 as the number of slits 736 extending from the bottom apertures 734 on the bottom panel 712. Additionally, as shown in FIG. 18, the spacing between the slots 744 may substantially match the spacing between the slits 736 extending from the bottom apertures 734.

One or more of the plurality of bottom apertures 734 and/or one or more of the slits 736 may be sized to receive at least a part of a reel mechanism to mount the reel mechanism within the reel slot 308. Additionally, one or more of the plurality of slots 744 may be sized to receive at least a part of the reel mechanism for mounting within the reel slot 308.

Figure 19:
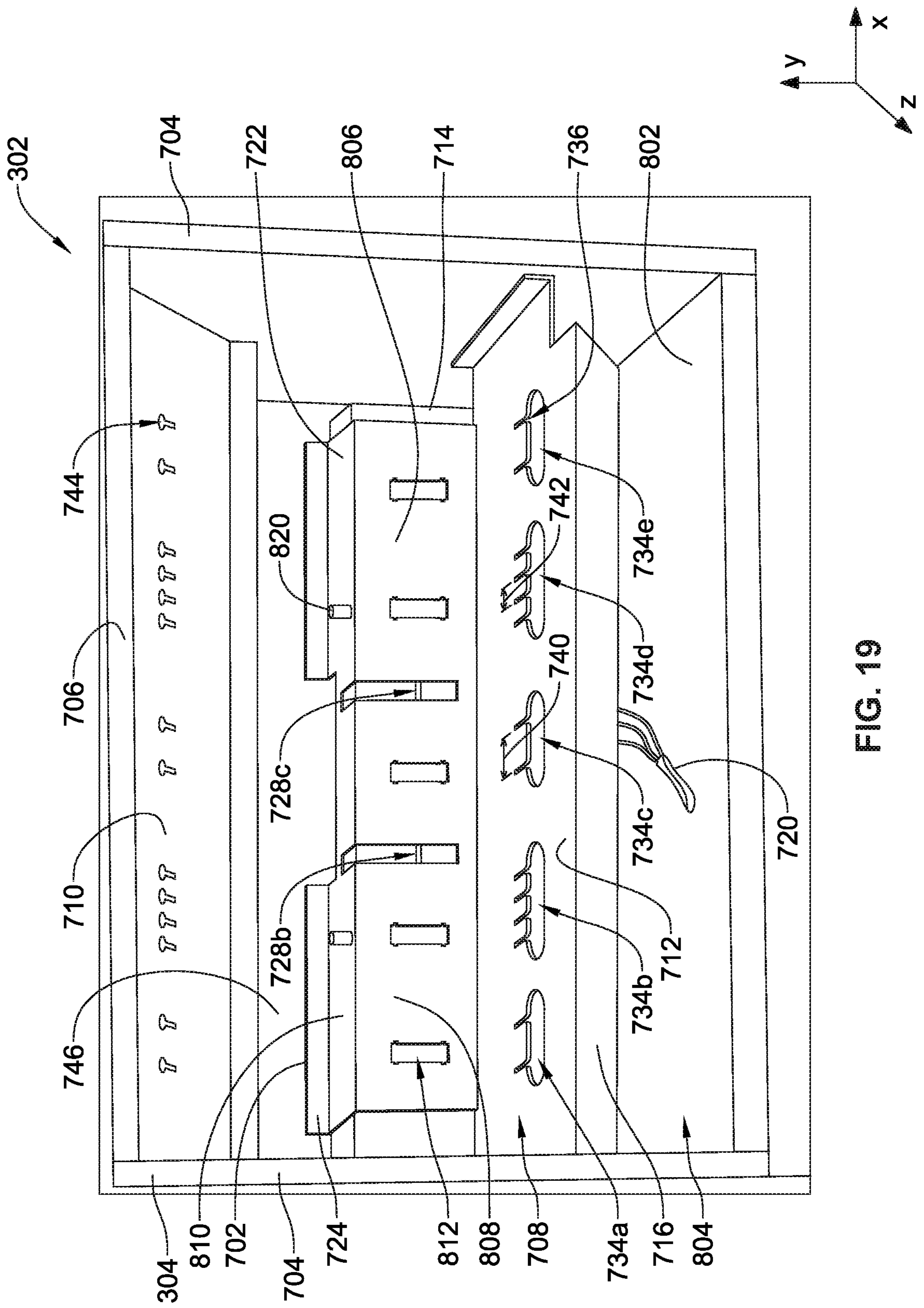
FIG. 19 is another front view of the example reel mount assembly shown in FIG. 18.

FIG. 19 is a front view of the reel mount assembly 302 within the cabinet 304 with the reel mechanisms 318 removed so that the reel mounting locations are visible. In the example embodiment, the cabinet 304 also includes a bottom wall 802 between the side walls 704. The bottom wall 802 extends horizontally along the x-z plane, the bottom wall 802 being substantially perpendicular to the back wall 702 and substantially parallel to the top wall 706. In the example embodiment, the bottom wall 802 is below the bottom panel 712 of the reel mount assembly 302, such that a second cavity 804 is defined by the side walls 704, the bottom panel 712, and the bottom wall 802.

In the example embodiment, the reel mount assembly 302 also includes a plurality of panels 806. Each panel 806 includes a front panel 808 and a top panel 810, with the top panel 810 connected to, and substantially perpendicular to, the front panel 808. The front panel 808 is substantially parallel to, and may be in face-to-face contact with, the back panel 714. Additionally, the top panel 810 is substantially parallel to, and may be in face-to-face contact with, the top lip 722 of the back panel 714.

In the example embodiment, the front panel 808 includes an aperture 812. The aperture 812 is oriented such that the wiring 720 (shown in FIG. 19) connects the reel mechanism within the respective reel slot 308 (shown in FIGS. 15 and 17) through the back aperture 718 of the back panel 714 and the aperture 812 of the front panel 808. The aperture 812 may vary in size and/or shape. For example, in some embodiments, the aperture 812 of the front panel 808 may be smaller than the respective back aperture 718 of the back panel 714, such that the height and/or width of the aperture 812 may be less than the respective height and/or width of the respective back aperture 718. The aperture 812 and/or the back aperture 718 may be sized to receive an electrical connection to connect one or more of the mounted reels within the respective reel slot 308 to the EGM, allowing the EGM to send electronic signals to the one or more of the mounted reels to control the display.

Figure 20:
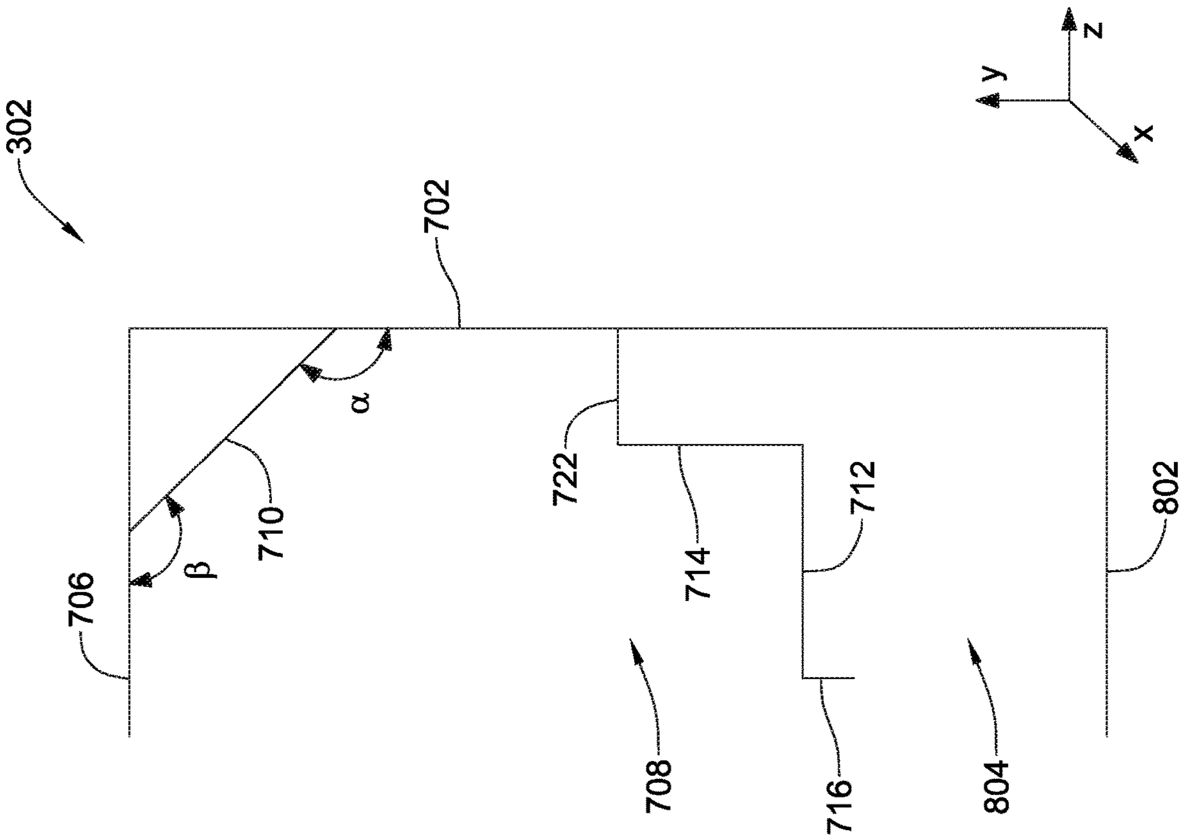
FIG. 20 is a schematic illustration of the example reel mount assembly shown in FIG. 18.

FIG. 20 is a schematic illustration of a side view of the reel mount assembly 302 within the cabinet 304. The cavity 708 may be defined by the back wall 702, the top wall 706, and the bottom panel 712. Additionally, the second cavity 804 may be defined by the back wall 702, the bottom panel 712, and the bottom wall 802.

Figure 21:
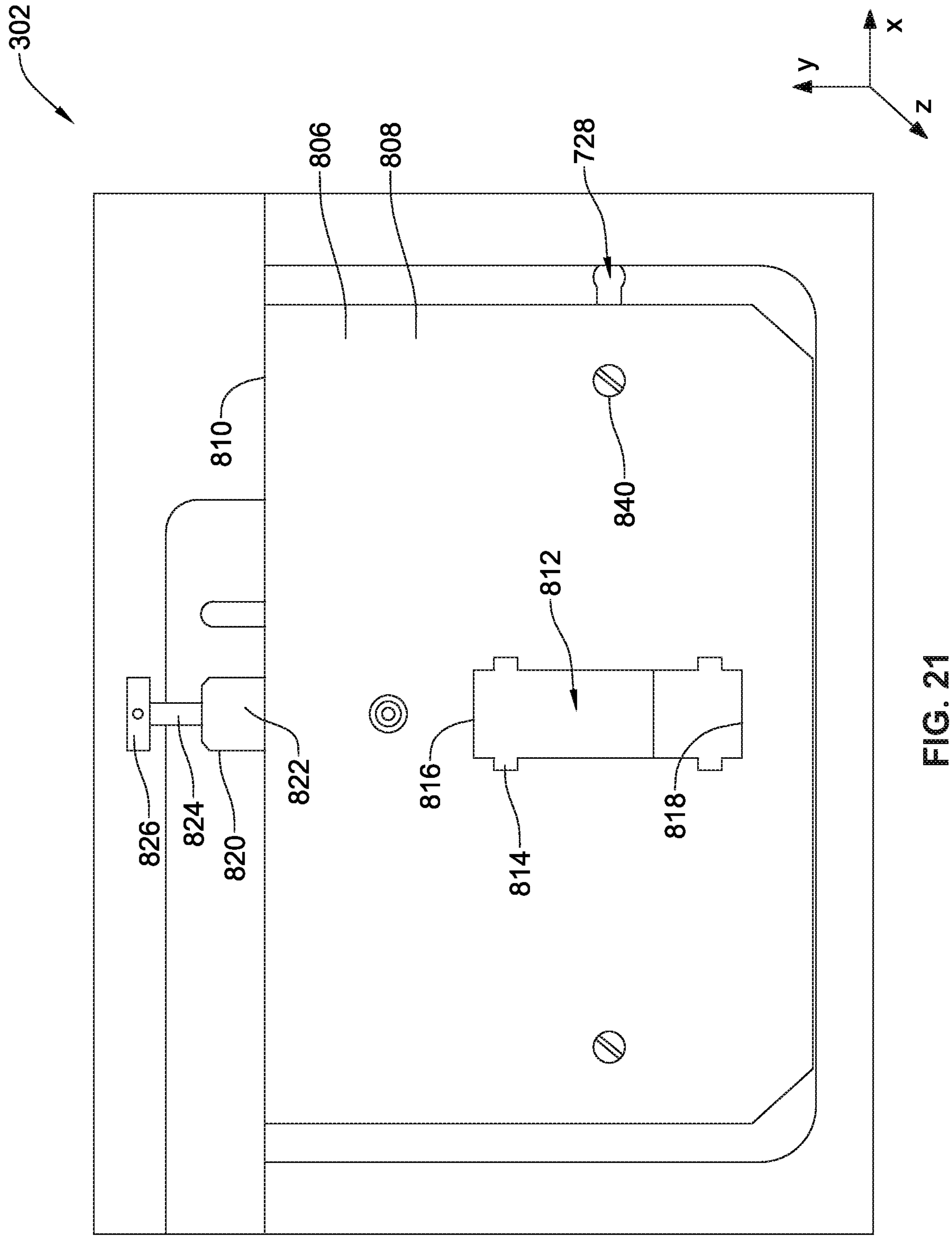
FIG. 21 is a front perspective view of an example reel mounting location on the example reel mount assembly shown in FIG. 19.

FIG. 21 is a front view of the panel 806 of the reel mount assembly 302, including the front panel 808 and the top panel 810. The aperture 812 of the front panel 808 may vary in size and shape. For example, in some embodiments, the aperture 812 may have a substantially rectangular shape, with a length dimension along the y-direction that is greater than a width dimension along the x-direction. The aperture 812 may include one or more protrusions or notches 814 proximate a top end 816 and/or a bottom end 818 of the aperture 812. As shown in FIG. 20, the aperture 812 may include one or more of the protrusions 814 proximate the top end 816 of the aperture 812 and extending opposite each other in the x-direction. Additionally, as shown in FIG. 20, the aperture 812 may include one or more of the protrusions 814 proximate the bottom end 818 of the aperture 812 and extending opposite each other in the x-direction. In some embodiments, the size and/or shape of the aperture 812 may be based on the size and/or shape of the wiring 720 (shown in FIG. 19).

Figure 22:
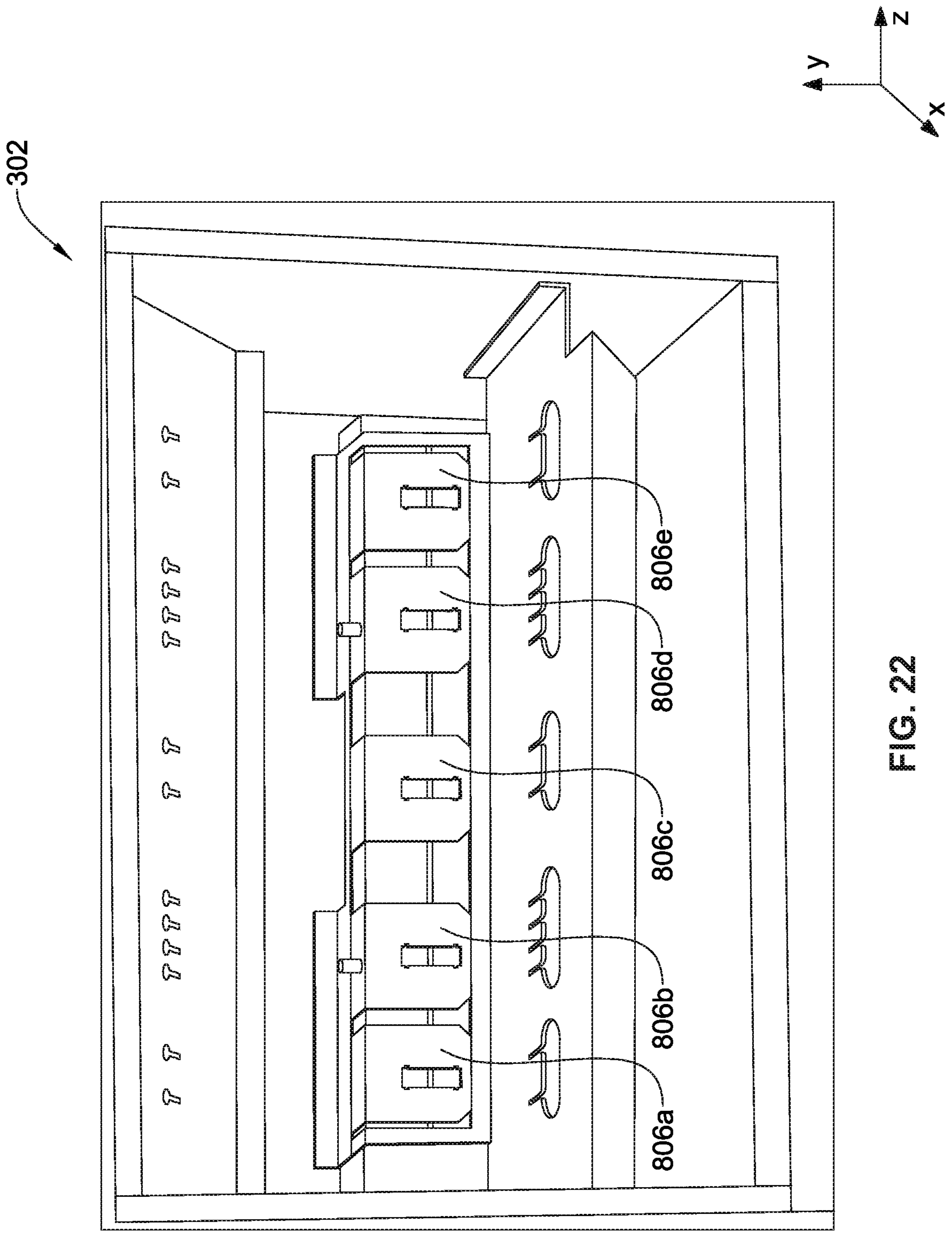
FIG. 22 is another front view of the example reel mount assembly shown in FIG. 19.
Figure 23:
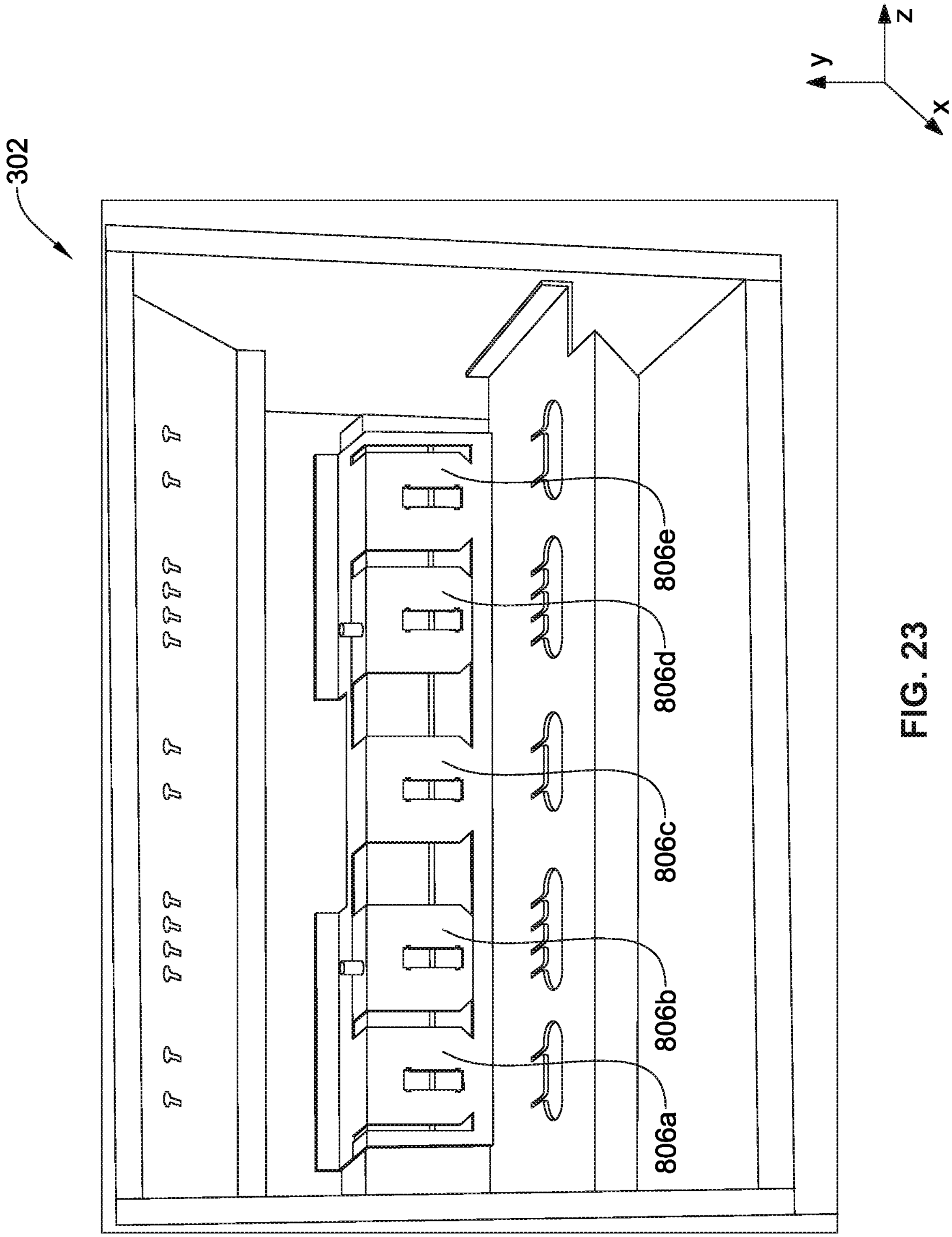
FIG. 23 is a further front view of the example reel mount assembly shown in FIG. 19.

In the example embodiment, one or more of the plurality of panels 806 is configured for horizontal movement in the x-direction to facilitate supporting multiple reel configurations. As shown in FIGS. 22 and 23, the plurality of panels 806 may include a first panel 806*a*, a second panel 806*b*, a third panel 806*c*, a fourth panel 806*d*, and/or a fifth panel 806*e*. In the example embodiment, the second and fourth panels 806*b*, 806*d* are formed as separate panels. In some embodiments, the first, third, and fifth panels 806*a*, 806*c*, 806*e* may be formed as separate panels (shown in FIG. 22). In other embodiments, the first, third, and fifth panels 806*a*, 806*c*, 806*e* may be formed as a combined panel that includes each of the first, third, and fifth panels 806*a*, 806*c*, 806*e* (shown in FIG. 23).

As shown in FIGS. 22 and 23, the second and fourth panels 806*b*, 806*d* may be configured to move horizontally in the x-direction to facilitate supporting multiple reel configurations. For example, as shown in FIG. 14, the horizontal movement of the second and fourth panels 806*b*, 806*d* may facilitate supporting the first reel configuration, including five of the reel slots 308. Additionally, for example, as shown in FIG. 16, the horizontal movement of the second and fourth panels 806*b*, 806*d* may facilitate supporting the second reel configuration, including three of the reel slots 308.

In the example embodiment, each of the panels 806 configured to move horizontally includes a locking mechanism 820 that facilitates positioning the panel 806 to facilitate supporting multiple reel configurations. The locking mechanism 820 includes a shaft 822 and a pin 824, with the shaft 822 being coupled to the top panel 810 and oriented to receive the pin 824 in a vertical direction along the y-plane (e.g., with a length dimension of the pin 824 being along the y-plane). As shown in FIG. 21, the pin 824 may include a pin head 826 at a top 828 of the pin 824.

FIG. 22 is a front view of the reel mount assembly 302 within the cabinet 304. As shown in FIG. 22, each of the plurality of panels 806 (e.g., the first panel 806*a*, the second panel 806*b*, the third panel 806*c*, the fourth panel 806*d*, and the fifth panel 806*e*) may be formed as separate panels.

FIG. 23 is a front view of the reel mount assembly 302 within the cabinet 304. As shown in FIG. 23, the second and fourth panels 806*b*, 806*d* may be formed as separate panels and the first, third, and fifth panels 806*a*, 806*c*, 806*e* may be formed as a combined panel.

Figure 24B:
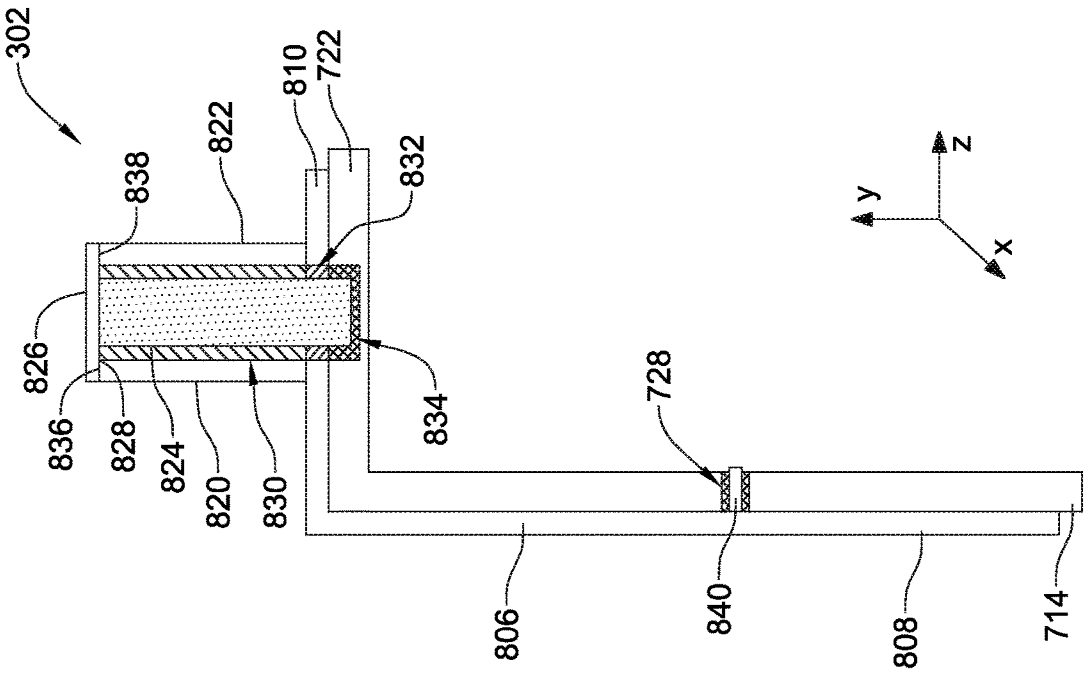
FIGS. 24A-24B are schematic illustrations of an example reel mounting location on the example reel mount assembly shown in FIG. 19.
Figure 24A:
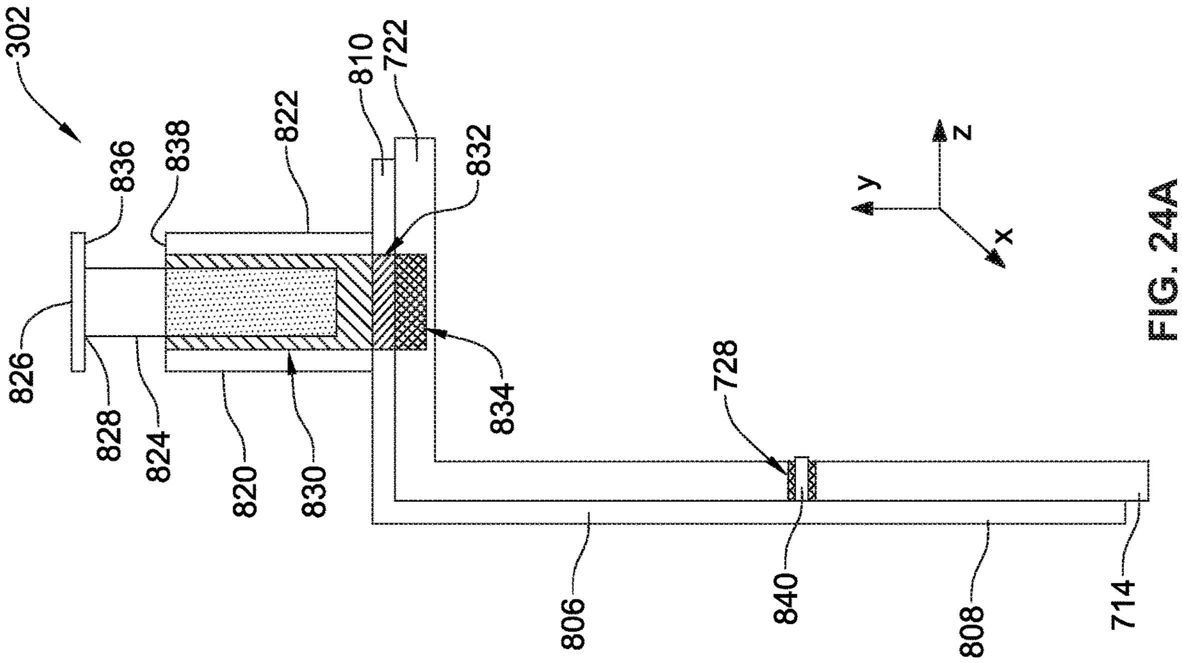

FIGS. 24A-24B are schematic illustrations of a side view of the locking mechanism 820 of one or more of the plurality of panels 806 of the reel mount assembly 302, such as the one or more of the plurality of panels 806 that are configured to move horizontally along the x-plane. In the example embodiment, the locking mechanism 820 is configurable to support a first pin configuration (shown in FIG. 24A), with the pin 824 in a raised position, and a second pin configuration (shown in FIG. 24B), with the pin 824 in a lowered position.

In the example embodiment, the shaft 822 includes a shaft aperture 830 into which the pin 824 is lowered for the second pin configuration (shown in FIG. 24B). The top panel 810 may include a first aperture 832 directly below the shaft aperture 830, such that the shaft aperture 830 and the first aperture 832 may be described as forming a "continuous" aperture into which the pin 824 is lowered for the second pin configuration (shown in FIG. 24B). Additionally, the top lip 722 of the back panel 714 may include a second aperture 834 directly below the first aperture 832, such that the shaft aperture 830, the first aperture 832, and the second aperture 834 may be described as forming a "continuous" aperture into which the pin 824 is lowered for the second pin configuration (shown in FIG. 24B). In some embodiments, the first aperture 832 and/or the second aperture 834 may be the same size and/or shape as the shaft aperture 830. In other embodiments, the first aperture 832 and/or the second aperture 834 be of a different size and/or shape than the shaft aperture 830.

As shown in FIG. 24A, the first pin configuration includes the pin 824 in a raised position such that there is no contact between a bottom surface 836 of the pin head 826 and an upper surface 838 of the shaft 822. The first pin configuration may include a portion of the pin 824 being within the shaft aperture 830 and a portion of the pin 824 being exterior to the shaft aperture 830. Thus, in the first pin configuration, the pin 824 may not inhibit the horizontal movement of the panel 806 in the x-direction, as no portion of the pin is within either the first aperture 832 of the top panel 810 or the second aperture 834 of the top lip 722 of the back panel 714.

As shown in FIG. 24B, the second pin configuration includes the pin 824 in a lowered position such that the bottom surface 836 of the pin head 826 is in face-to-face contact with an upper surface 838 of the shaft 822. The second pin configuration may include a portion of the pin 824 being within the shaft aperture 830, the first aperture 832 of the top panel 810, and/or the second aperture 834 of the top lip 722 of the back panel 714, with no portion of the pin 824 being exterior to the shaft aperture 830. Thus, in the second pin configuration, pin 824 may inhibit the horizontal movement of the panel 806 in the x-direction, due to the portion of the pin 824 within the first aperture 832 of the top panel 810 and/or the second aperture 834 of the top lip 722 of the back panel 714.

In the example embodiment, the positioning of the one or more panels 806 that are movable along the back panel 714 facilitates supporting the first reel configuration, including five of the reel slots 308, and/or the second reel configuration, including three of the reel slots 308. For example, the one or more panels 806 that are movable may include a fastening pin 840 coupled to the front panel 808, with the fastening pin 840 oriented towards the back panel 714 to be received by one of the plurality of channels 728. As shown in FIG. 21, the one or more panels 806 may include two of the fastening pins 840 oriented to move horizontally within the respective channel 728 as the panels 806 are moved horizontally along the x-plane.

In the example embodiment, the locking mechanism 820 facilitates reconfiguring the reel mount assembly 302 between the first reel configuration, including five of the reel slots 308, and the second reel configuration, including three of the reel slots 308. Specifically, the pin 824 of the locking mechanism 820 is raised and/or lowered within the shaft 822 to facilitate moving one or more of the panels 806 to space the apertures 812 of the plurality of panels 806 as needed to accommodate a set number of reel slots 308. For example, to accommodate three of the reel slots 308, the second and fourth panels 806*b*, 806*d* may be moved towards the respective side wall 704 of the cabinet to increase the space between the apertures 812 of the second, third, and fourth panels 806*b*, 806*c*, 806*d*, such that three of the second reel mechanism 318 (e.g., a decreased number of a broader reel mechanism) may be supported. Additionally, for example, to accommodate five of the reel slots 308, the second and fourth panels 806*b*, 806*d* may be moved away from the respective side wall 704 of the cabinet to decrease the space between the apertures 812 of the second, third, and fourth panels 806*b*, 806*c*, 806*d*, such that five of the first reel mechanism 316 (e.g., an increased number of a narrower reel mechanism) may be supported.

One or more of the reel slots 308 may be configured to engage with one or more of the slots 744 (shown in FIG. 19) and/or with one or more of the slits 736 of the respective bottom aperture 734 (shown in FIG. 19). For example, for the reel mount assembly 302 to accommodate three of the reel slots 308, the reel slots 308 may engage with a first set of slots 744 and/or a first set of slits 736 that align with the increased spacing between the second, third, and fourth panels 806*b*, 806*c*, 806*d*. Additionally, for example, for the reel mount assembly 302 to accommodate five of the reel slots 308, the reel slots 308 may engage with a second set of slots 744 and/or a second set of slits 736 that align with the decreased spacing between the second, third, and fourth panels 806*b*, 806*c*, 806*d*.

Figure 25:
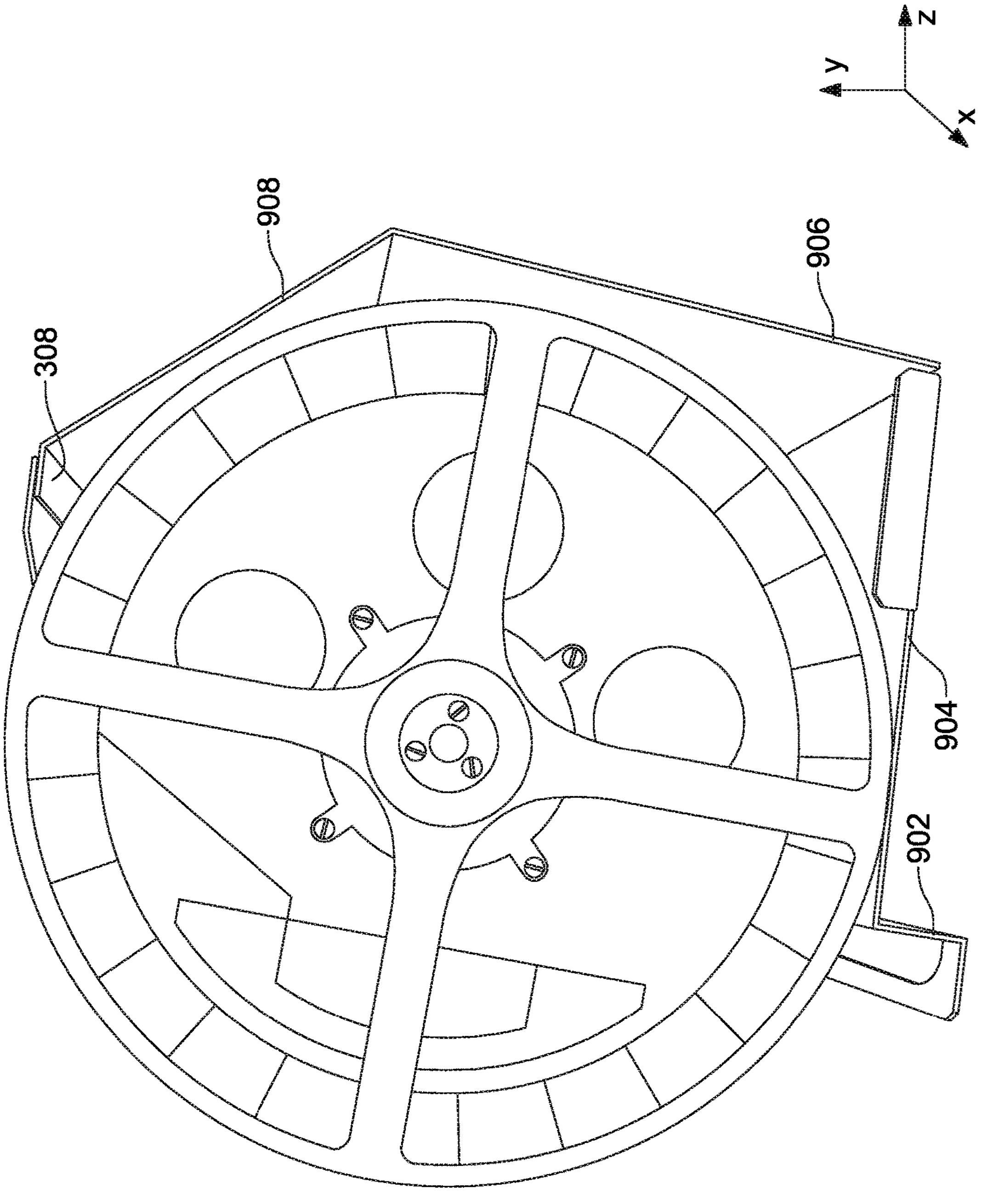
FIG. 25 is a side view of a reel mechanism for use with the example reel mount assembly of FIG. 19.

FIG. 25 is a side view of the reel slot 308 to be installed into the reel mount assembly 302. The reel slot 308 may include a plurality of surfaces that aligns with the various panels of the reel mount assembly 302. As shown in FIG. 25, the reel slot 308 may include a first surface 902, a second surface 904, a third surface 906, and/or a fourth surface 908. When installed in the reel mount assembly 302, the first surface 902 may align with the front lip 716 of the bottom panel 712, the second surface 904 may align with the bottom panel 712, the third surface 906 may align with the back panel 714, and/or the fourth surface 908 may align with the top panel 710. In some embodiments, the aligned surfaces and panels may be in face-to-face contact. In other embodiments, the aligned surfaces and panels may be in close proximity.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A mechanical gaming machine reel, comprising:
- a reel strip comprising one or more tabs; and
- a reel basket comprising one or more slots, operable to receive the one or more tabs,
- wherein the reel strip is connectable to the reel basket by wrapping the reel strip around the reel basket and inserting the one or more tabs into corresponding one or more slots of the reel basket.

2. The mechanical gaming machine reel of claim 1, wherein:
- the reel strip further comprises one or more indents disposed in an edge of the reel strip and positioned proximate an end of the reel strip; and
- the reel basket further comprises one or more detents positioned adjacent a circumferential retaining wall,
- wherein the indent of the reel strip is operable to engage with the detent of the reel basket to indicate a starting position of the reel strip relative to the reel basket.

3. The mechanical gaming machine reel of claim 2, wherein:
- the one or more tabs comprises a first tab positioned on a first edge of the reel strip and a second tab positioned on a second edge of the reel strip; and
- the one or more slots comprises a first slot disposed in a first circumferential retaining wall and a second slot disposed in a second circumferential retaining wall,
- wherein, the reel strip is positionable between and is at least partially retained by the first circumferential retaining wall and the second circumferential retaining wall.

4. The mechanical gaming machine reel of claim 3, wherein the first tab and the first slot are in line with the second tab and the second slot.

5. The mechanical gaming machine reel of claim 3, wherein the first tab and the first slot are offset from the second tab and the second slot.

6. The mechanical gaming machine reel of claim 3, wherein:
- the one or more indents comprises a first indent disposed in the first edge of the reel strip and a second indent disposed in the second edge of the reel strip; and
- the one or more detents comprises a first detent positioned adjacent the first circumferential retaining wall and a second detent positioned adjacent the second circumferential retaining wall.

7. The mechanical gaming machine reel of claim 6, wherein: the first indent and the second indent of the reel strip are positioned unidirectionally with the first detent and second detent of the reel basket relative to the first tab, the second tab, the first slot, and the second slot, thereby ensuring that the reel strip is installed on the reel basket in an assembled orientation.

8. The mechanical gaming machine reel of claim 7, further comprising an adhesive layer positioned proximate either a first end or a second end of the reel strip, wherein the adhesive layer is operable to adhere the first end to the second end when the reel strip is wrapped around the reel basket.

9. The mechanical gaming machine reel of claim 1, wherein the reel basket further comprises:
- a first circumferential retaining wall;
- a second circumferential retaining wall;
- a plurality of supports disposed between the first circumferential retaining wall and the second circumferential retaining wall;
- a drive attachment portion; and
- a plurality of arms disposed between the drive attachment portion and either the first circumferential retaining wall or the second circumferential retaining wall,
- wherein, the reel strip is positionable between and is at least partially retained by the first circumferential retaining wall, the second circumferential retaining wall, and the plurality of supports.

10. A reel strip retention system, comprising:
- a reel basket including a plurality of slots; and
- a reel strip including a plurality of tabs,
- wherein the reel basket is operable to retain the reel strip by wrapping the reel strip around the reel basket and inserting the plurality of tabs into the plurality of slots.

11. The reel strip retention system of claim 10, wherein:
- the plurality of tabs comprises a plurality of pairs of tabs positioned successively on a right edge and a left edge of the reel strip; and
- the plurality of slots comprises a plurality of pairs of slots disposed successively in a right circumferential retaining wall and a left circumferential retaining wall.

12. The reel strip retention system of claim 11, wherein the plurality of pairs of tabs and the plurality of pairs of slots comprise a pair of tabs most proximate a first end of the reel strip and a pair of tabs most proximate an opposite second end of the reel strip inserted into a corresponding pair of slots.

13. The reel strip retention system of claim 11, wherein:
- the reel strip further comprises at least one indent positioned proximate an end of the reel strip; and
- the reel basket further comprises at least one detent,
- wherein the at least one indent of the reel strip is operable to engage with the at least one detent of the reel basket to indicate a starting position of the reel strip relative to the reel basket.

14. The reel strip retention system of claim 13, wherein the at least one indent of the reel strip and the at least one detent of the reel basket are positioned unidirectionally relative to the plurality of pairs of tabs and the plurality of pairs of slots, thereby ensuring that the reel strip is installed into the reel basket in an assembled orientation.

15. The reel strip retention system of claim 10, further comprising an adhesive layer positioned proximate either a first end of the reel strip or a second end of the reel strip, wherein the adhesive layer is operable to adhere the first end of the first end of the reel strip to the second end of the reel strip when the reel strip is wrapped around the reel basket.

16. The reel strip retention system of claim 10, wherein the reel strip further comprises:
- an elongated tab positioned adjacent a first end of the reel strip; and
- an elongated slot disposed adjacent a second end of the reel strip,
- wherein the elongated slot is operable to receive and retain the elongated tab such that the first end of the reel strip is retained to the second end of the reel strip when the reel strip is wrapped around the reel basket.

17. The reel strip retention system of claim 10, wherein the reel basket further comprises:

a right circumferential retaining wall;

a left circumferential retaining wall;

a plurality of supports disposed between the right circumferential retaining wall and the left circumferential retaining wall;

a drive attachment portion; and a plurality of arms disposed between the drive attachment portion and either the right circumferential retaining wall or the left circumferential retaining wall, wherein, the reel strip is positionable between and at least partially retained by the right circumferential retaining wall, the left circumferential retaining wall, and the plurality of supports.

18. A method for mounting a reel strip including a plurality of tabs and at least one indent onto a reel basket including a corresponding plurality of slots and at least one detent, the method comprising:

positioning the reel strip onto the reel basket;

engaging the at least one detent on the reel basket with the at least one indent positioned proximate a first end of the reel strip;

confirming a orientation of the reel strip for assembly of the reel strip and the reel basket by at least partially wrapping the reel strip around the reel basket and confirming an alignment of the plurality of tabs of the reel strip relative to the plurality of slots on the reel basket;

inserting a tab most proximate the first end of the reel strip into a corresponding slot on the reel basket;

wrapping the reel strip around the reel basket and successively inserting the plurality of tabs into corresponding plurality of slots up to and including a tab most proximate a second, and opposite, end of the reel strip;

pressing the second end of the reel strip onto the first end of the reel strip to adhere the first end of the reel strip with the second end of the reel strip via an adhesive layer.

19. The method of claim 18, wherein:

the plurality of tabs comprises a plurality of pairs of tabs positioned successively on a right edge and a left edge of the reel strip, wherein the plurality of pairs of tabs comprises at least three pairs of tabs; and the plurality of slots comprises a corresponding plurality of pairs of slots disposed successively in a right circumferential sidewall and a left circumferential side wall, wherein the corresponding plurality of pairs of slots comprises two pairs of slots.

20. The method of claim 18, wherein the tab most proximate the first end of the reel strip and the tab most proximate the second end of the reel strip are inserted into the same slot.

* * * * *